(12) United States Patent
Sajeepa et al.

(10) Patent No.: US 9,892,075 B2
(45) Date of Patent: Feb. 13, 2018

(54) POLICY DRIVEN STORAGE IN A MICROSERVER COMPUTING ENVIRONMENT

(71) Applicant: CISCO TECHNOLOGY, INC., San Jose, CA (US)

(72) Inventors: Prabhath Sajeepa, San Jose, CA (US); Sagar Borikar, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 234 days.

(21) Appl. No.: 14/965,750

(22) Filed: Dec. 10, 2015

(65) Prior Publication Data

US 2017/0168970 A1 Jun. 15, 2017

(51) Int. Cl.
| | |
|---|---|
| *G06F 13/38* | (2006.01) |
| *G06F 13/24* | (2006.01) |
| *G06F 13/16* | (2006.01) |
| *G06F 13/40* | (2006.01) |
| *G06F 13/42* | (2006.01) |

(52) U.S. Cl.
CPC ........ *G06F 13/385* (2013.01); *G06F 13/1631* (2013.01); *G06F 13/24* (2013.01); *G06F 13/4022* (2013.01); *G06F 13/4282* (2013.01)

(58) Field of Classification Search
CPC .... G06F 13/385; G06F 13/24; G06F 13/1631; G06F 13/4022; G06F 13/4282
See application file for complete search history.

(56) References Cited

U.S. PATENT DOCUMENTS

| | | | | |
|---|---|---|---|---|
| 5,535,336 | A | * 7/1996 | Smith | ...................... H04L 12/40 340/9.1 |
| 7,840,730 | B2 | * 11/2010 | D'Amato | ................ G06F 3/062 709/226 |

(Continued)

FOREIGN PATENT DOCUMENTS

WO WO 2009146165 A1 * 12/2009 ........... G06F 9/5077

OTHER PUBLICATIONS

Steve McQuerry, "*Cisco UCS M-Series Modular Servers for Cloud-Scale Workloads*," White Paper, Cisco Systems, Inc., Sep. 2014, 11 pages; http://www.cisco.com/c/en/us/solutions/collateral/data-center-virtualization/unified-computing/whitepaper_c11-732876.pdf.

*Primary Examiner* — Ernest Unelus
*Assistant Examiner* — Ronald Modo
(74) *Attorney, Agent, or Firm* — Polsinelli PC

(57) ABSTRACT

An example method for facilitating policy-driven storage in a microserver computing environment is provided and includes receiving, at an input/output (I/O) adapter in a microserver chassis having a plurality of compute nodes and a shared storage resource, policy contexts prescribing storage access parameters of respective compute nodes and enforcing the respective policy contexts on I/O operations by the compute nodes, in which respect a particular I/O operation by any compute node is not executed if the respective policy context does not allow the particular I/O operation. The method further includes allocating tokens to command descriptors associated with I/O operations for accessing the shared storage resource, identifying a violation of any policy context of any compute node based on availability of the tokens, and throttling I/O operations by other compute nodes until the violation disappears.

20 Claims, 15 Drawing Sheets

(56) References Cited

U.S. PATENT DOCUMENTS

| | | | |
|---|---|---|---|
| 9,471,348 B2* | 10/2016 | Zuo | H04L 47/20 |
| 2005/0235072 A1 | 10/2005 | Smith et al. | |
| 2012/0297088 A1* | 11/2012 | Wang | H04L 63/0272 |
| | | | 709/238 |
| 2014/0123207 A1* | 5/2014 | Agarwal | G06F 21/6218 |
| | | | 726/1 |

* cited by examiner

|  | FILTER | FILTER ID | ACTION |
|---|---|---|---|
| SCSI CMD FILTER | DA=0xAAAAAAAAAAAA<br>SA=0xBBBBBBBBBBBB<br>ETH TYPE=0xFFFF | 1 | FLOW TABLE LOOKUP |
| SCSI RSP FILTER | DA=0xBBBBBBBBBBBB<br>SA=0xAAAAAAAAAAAA<br>ETH TYPE=0xFFFF | 2 | FLOW TABLE LOOKUP |
| | DA=0xBBBBBBBBBBBB<br>SA=0xAAAAAAAAAAAA<br>ETH TYPE=0xFFFE | 3 | FLOW TABLE LOOKUP |

FIG. 7

| KEY (2 BYTES) | PACKET COUNT (4 BYTES) | TOTAL IO BYTES (8 BYTES) | IOPS (4 BYTES) | sNIC POLICY CONTEXT | REWRITE RULE | STEERING ACTION |
|---|---|---|---|---|---|---|
| 00001<LIF id-x>FT ENTRY FOR CMD | TOTAL COMMAND COUNT FOR sNIC-1 | | IOPS FOR sNIC-1 | QoS POLICY CTXT FOR sNIC-1 | ARBITER REWRITE RULE FOR CMD | FORWARD PACKET TO RQx |
| 00001<LIF id-y>FT ENTRY FOR CMD | TOTAL COMMAND COUNT FOR sNIC-y | | IOPS FOR sNIC-y | QoS POLICY CTXT FOR sNIC-y | ARBITER REWRITE RULE FOR CMD | FORWARD PACKET TO RQy |
| ooo | ooo | ooo | ooo | ooo | ooo | ooo |
| 00002<LIF id-x>FT ENTRY FOR RSP | TOTAL COMPLETION COUNT FOR sNIC-1 | TOTAL BYTES TRANSFERRED FOR sNIC-1 | | ADDRESS OF QoS POLICY CTXT FOR sNIC-1 | ARBITER REWRITE RULE FOR RSP | FORWARD PACKET TO RQ ON Host-1 |
| 00002<LIF id-y>FT ENTRY FOR RSP | TOTAL COMPLETION COUNT FOR sNIC-y | TOTAL BYTES TRANSFERRED FOR sNIC-y | | ADDRESS OF QoS POLICY CTXT FOR sNIC-y | ARBITER REWRITE RULE FOR RSP | FORWARD PACKET TO RQ ON Host-y |
| ooo | ooo | ooo | | ooo | ooo | ooo |
| 00003<LIF id-x>FT ENTRY FOR BUSY RSP | TOTAL NUMBER OF COMMANDS BUSIED FOR sNIC-1 | | | | DECAP REWRITE RULE | FORWARD PACKET TO RQ ON Host-1 |
| 00003<LIF id-y>FT ENTRY FOR BUSY RSP | TOTAL NUMBER OF COMMANDS BUSIED FOR sNIC-y | | | | DECAP REWRITE RULE | FORWARD PACKET TO RQ ON Host-y |

FIG. 10

POLICY DRIVEN STORAGE IN A MICROSERVER COMPUTING ENVIRONMENT

TECHNICAL FIELD

This disclosure relates in general to the field of communications and, more particularly, to policy-driven storage in a microserver computing environment.

BACKGROUND

Microservers are an emerging trend of servers for processing lightweight, scale out workloads for hyper-scale data centers with large numbers of relatively lightweight server nodes. The microserver represents a new server architecture characterized by many (e.g., tens or even hundreds) lightweight server nodes bundled together in a shared chassis infrastructure, for example, sharing power, cooling fans, and input/output components, eliminating space and power consumption demands of duplicate infrastructure components. The microserver topology facilitates density, lower power per node, reduced costs, and increased operational efficiency. Microservers are generally based on small form-factor, system-on-a-chip (SoC) boards, which pack processing capability, memory, and system input/output onto a single integrated circuit.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 7 is a simplified block diagram illustrating yet other example details of embodiments of the communication system;

FIG. 10 is a simplified block diagram illustrating yet other example details of embodiments of the communication system;

DETAILED DESCRIPTION OF EXAMPLE EMBODIMENTS

Overview

An example method for facilitating policy-driven storage in a microserver computing environment is provided and includes receiving, at an input/output (I/O) adapter in a microserver chassis having a plurality of compute nodes and a shared storage resource, policy contexts prescribing (e.g., indicating, specifying, comprising, designating, etc.) storage access parameters of respective compute nodes and enforcing the respective policy contexts on I/O operations by the compute nodes, in which respect a particular I/O operation by any compute node is not executed if the respective policy context does not allow the particular I/O operation. The method further includes allocating (e.g., distributing, assigning, issuing, dispensing, etc.) tokens to command descriptors associated with I/O operations for accessing the shared storage resource, identifying a violation of any policy context of any compute node based on availability of the tokens, and throttling (e.g., regulating, decreasing, controlling, adjusting, choking, curbing, reducing, etc.) I/O operations by other compute nodes until the violation disappears.

As used herein, the term "policy context" of a compute node refers to a software object (e.g., structure) containing information (e.g., values of one or more relevant variables) related to one or more policies (e.g., conditions, rules, parameters, restrictions, constraints, etc.) to be applied on the compute node. As used herein, the term "compute node" refers to a hardware processing apparatus, in which user applications (e.g., software programs) are executed.

Example Embodiments

Figure 1A:
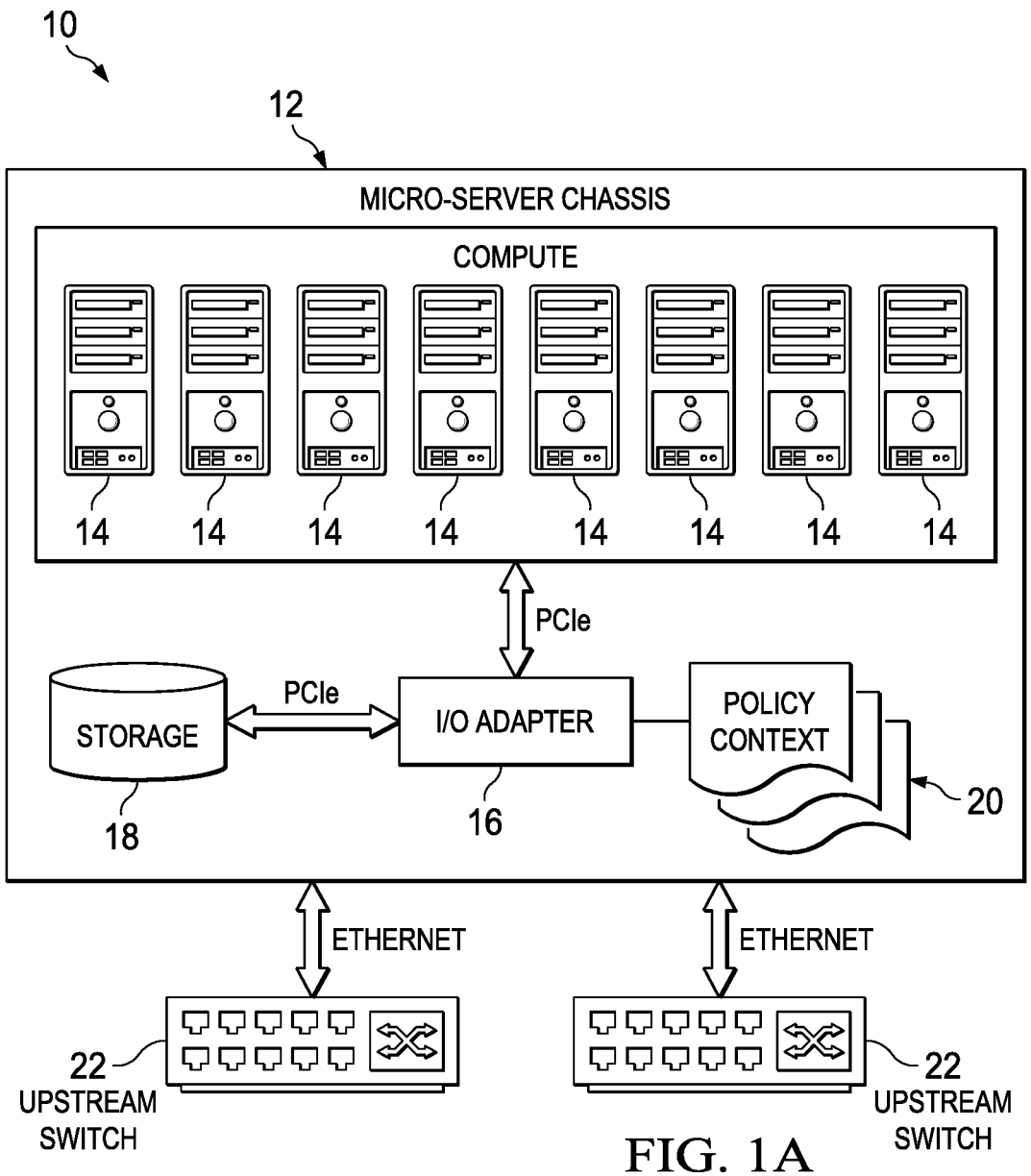
FIG. 1A is a simplified block diagram illustrating a communication system for policy-driven storage in a microserver computing environment.

Turning to FIG. 1, FIG. 1 is a simplified block diagram illustrating a communication system 10 for policy-driven storage in a microserver computing environment in accordance with one example embodiment. Communication system 10 includes a microserver chassis 12 comprising a plurality of compute nodes 14 sharing access to network and storage resources through a common input/output (I/O) adapter 16 (also called as Virtual Interface Card (VIC)). Note that the label "14" may refer to a single compute node, or it may refer to a plurality of compute nodes. Because the compute nodes are interchangeable in the sense that the description provided herein applies to all of them equally, irrespective of their particular computing, processing, and physical characteristics, using the label in the singular or plural is not intended to affect the meaning or scope of the embodiments.

I/O adapter 16 services (e.g., processes) both network and storage access requests from compute nodes 14 within microserver 12. In various embodiments, compute nodes 14 may access a shared storage resource 18 through I/O adapter 16 according to policy contexts 20 over a shared transmission medium, such as a Peripheral Component Interconnect Express (PCIe) bus. Each compute node 14 is associated with a corresponding policy context 20. Policy context 20 prescribe storage access parameters (e.g., input/output operations per second, minimum bandwidth, maximum bandwidth, etc.) of respective compute nodes 14.

Note that the label "20" may refer to a single policy context, or it may refer to a plurality of policy contexts without changing the scope of the embodiments. For example, policy context 20 may comprise a single software object comprising storage access parameters of substantially all compute nodes 14 in microserver chassis; in another example, policy context 20 may comprise a plurality of software objects, each such software object comprising storage access parameters of a corresponding one of compute nodes 14, and each such software object being referred to as a separate policy context. Irrespective of whether the label is used in the singular or plural, any policy context 20 comprises storage access parameters of one or more compute nodes 14 within the broad scope of the embodiments.

One or more switch(es) 22 outside microserver chassis 12 may provide network connectivity to a network external to microserver chassis 12. A management application, such as a Cisco® Unified Computing System™ (UCS) manager executing on (or through) switch 22 configures network endpoints (e.g., a network endpoint refers to a logical endpoint of network traffic corresponding to a specific network protocol layer) and storage endpoints (e.g., a storage endpoint refers to a logical endpoint for storage traffic) for each compute node 14 with user-defined attributes and capabilities. The UCS manager also provisions storage resource 18 (e.g., storage disks, memory space, boot space, logical unit numbers (LUNs), etc.) for each compute node 14 with suitable capacity and reliability characteristics (e.g., array of independent disks (RAID) level) according to user-provided instructions. An appropriate software executing on I/O adapter 16 creates suitable PCI endpoints on compute nodes 14, for example, associated with the respective network endpoints and storage endpoints. Respective host drivers managing the network endpoints and storage endpoints in corresponding compute nodes 14 plug into the appropriate network and storage stacks.

Some embodiments of communication system 10 facilitate network centric data center management with the network endpoints and storage endpoints being capable of being configured through centralized policy enforcement according to user-defined attributes and capabilities. Whereas the network endpoints have a peer representation on upstream switch 22 where policies can be enforced, storage resource 18 is local to microserver 12 and the storage endpoints exist solely in the domain within microserver chassis 12. In other words, the storage endpoints are inaccessible to switch 22 (e.g., storage traffic is local to microserver chassis 12 and does not traverse switch 22), and thus policy contexts 20 cannot be enforced at switch 22.

Compute nodes 14 may be of varying processing capacities and PCIe bandwidths. For example, in some embodiments, compute nodes 14 may comprise application specific servers, wherein the respective central processing units (CPUs) and storage resource 18 are custom-built for the applications executing thereon, with one of compute nodes 14 using a 2 GHz CPU and 512 MB of memory, another of compute nodes 14 using a 1 GHz CPU and 256 MB of memory, and so on. In another example, some workloads may require guaranteed bandwidth; some other workloads may require bandwidth to be restricted according to pre-defined parameters (e.g., network utilization, storage throughput, I/Os per second (IOPS), storage bandwidth utilization); etc. According to various embodiments, a data-center administrator can configure compute nodes 14 for various different workloads having different network and storage bandwidths through the UCS manager executing on switch 22. At least a portion of the configuration pertaining to accessing storage resource 18 may be stored locally in microserver chassis 12 as policy contexts 20 and enforced by I/O adapter 16.

In various embodiments, I/O adapter 16 may also facilitate collection of statistics on host network adapters and export them to UCS manager. The administrator can view per network interface statistics on a suitable graphical user interface (GUI) of UCS manager. In various embodiments, configuration of the various network endpoints and storage endpoints may be enforced through appropriate policies, which can change dynamically as desired by the administrator. VIC protocol control messages may be exchanged between microserver chassis 12 and switch 22 to apply the policies immediately (e.g., contemporaneously, simultaneously, within a predetermined time period, etc.). Thus, UCS manager provides a unified view of the data center and makes it easy for the administrator to administer any configuration change from a single control point.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Turning to memory retrieval operations, direct memory access (DMA) is an ability of a device (such as a compute node) to access local host memory directly, without the intervention of any central processing units (CPUs). Remote DMA (RDMA) is the ability of accessing (e.g., reading from or writing to) memory on a remote machine without interrupting the processing of the CPU(s) on the remote machine. Although compute nodes 14 are local within microserver chassis 12, they are remote relative to each other's compute and memory resources, and therefore RDMA can be used for data transfers between compute nodes 14 with minimal processor overhead and low latency.

RDMA communication is based on a set of three queues: (i) a send queue and (ii) a receive queue, comprising a Queue Pair (QP) and (iii) a Completion Queue (CQ). Posts in the QP are used to initiate the sending or receiving of data. An application (e.g., through a host driver) places instructions on its work queues that generate buffers in I/O adapter 16 to send or receive data. I/O adapter 16 consumes the instructions from the send queue at the egress side and streams the data to its memory region corresponding to the remote system. The memory region consumes the work queues at the receive queue at the ingress side and places the received data in appropriate memory regions of the host.

In a general sense, the RDMA traffic between compute nodes 14 in microserver chassis 12 does not leave the PCIe domain (e.g., shared transmission medium within microserver chassis 12 through which data is communicated according to PCIe protocols) and enter the Ethernet domain (e.g., Ethernet network outside microserver chassis 12 through which data is communicated according to Ethernet protocols). In other words, the RDMA traffic is local to microserver chassis 12 and does not traverse switch 22. On the other hand, network traffic from and to compute nodes 14 traverse switch 22. Therefore, unlike enforcement of network traffic related policies (of administrator provided instructions at UCS manager), enforcement of storage traffic related policies cannot be performed at switch 22.

Moreover, in such shared infrastructure deployments, in which shared storage resource 18 is fixed and limited in size, there is a potential for one compute node 14 to starve other compute nodes 14 by over utilizing shared storage resource 18. Thus, applications running on compute nodes 14 experience uneven storage performance despite corresponding compute nodes 14 having identical processing power and PCIe bandwidth.

In addition, because the storage interfaces of compute nodes 14 directly communicate with shared storage resource 18 through I/O adapter 16, bypassing switch 22, the I/O statistics are not accessible to the central UCS manager executing in switch 22. The administrator has to rely on statistics collected by storage stacks on each disparate compute node 14 for the I/O statistics. Any sort of storage traffic shaping has to be executed on respective compute nodes 14 and cannot be dynamically changed without manual intervention. In large data centers with hundreds and thousands of compute nodes 14 on separate microserver chassis, such manual adjustment of policies for each of compute nodes 14 may not be practical.

Further, because each compute node 14 has access only to its local storage traffic, any global analysis of the I/O statistics (e.g., such as shared load on the shared resources) cannot be facilitated by per-compute node policies enforced separately on each compute node 14. The operating system of each compute node 14 does not have a global view of storage traffic originating from all compute nodes to a shared storage infrastructure. Thus, while the operating system can offer ways to limit the bandwidth for the corresponding compute node 14, it cannot enforce policies guaranteeing a minimum bandwidth or throughput. Such a highly rigid manual approach can defeat centralized management of the data center.

As compute nodes 14 don different roles in the clustered multi-host environment, they run different applications and workloads, with corresponding differing requirements for network and storage bandwidth. Some applications also mandate certain minimum network and storage bandwidth at any given time for optimal performance. Whereas network QoS management has been well established and implemented across various network elements (e.g., OS stack, network adapter, switches, routers, etc.) in the network, technologies and solutions to manage storage QoS have been lagging. Storage area network (SAN) storage vendors have attempted to implement storage QoS on SAN switches and targets. However, the SAN solutions are not applicable for the microserver computing environment, in which every compute node 14 perceives storage as local, but share a common storage controller to access boot and data LUNs.

To provide storage QoS in such multi-host system, there is a need for sampling storage I/O commands across compute nodes 14 and arbitrating access to shared storage resource 18 based on administrator provided configuration. Moreover, there is a further need for the solution to be policy based, dynamic and centralized, working uniformly across all host platforms and operating systems, without separate agents executing on compute nodes 14 to shape storage traffic.

Communication system 10 is configured to such issues (among others) by facilitating policy-driven storage in a microserver computing environment. According to various embodiments, a human administrator defines QoS policies at switch 22 for storage adapters associated with compute nodes 14. The QoS policies define various parameters, such as maximum bandwidth allocated to a particular compute node 14, maximum number of IOPs allowed from a particular storage adapter, and/or minimum bandwidth to be guaranteed for a particular storage adapter. The policies are dynamic, in the sense that they can be changed at any time, irrespective of the state of compute node 14. Any changes in storage QoS policies are communicated substantially immediately to I/O adapter 16 through suitable VIC protocol control messages. The QoS policies are stored locally at I/O adapter 16 as policy context 20.

Figure 1B:
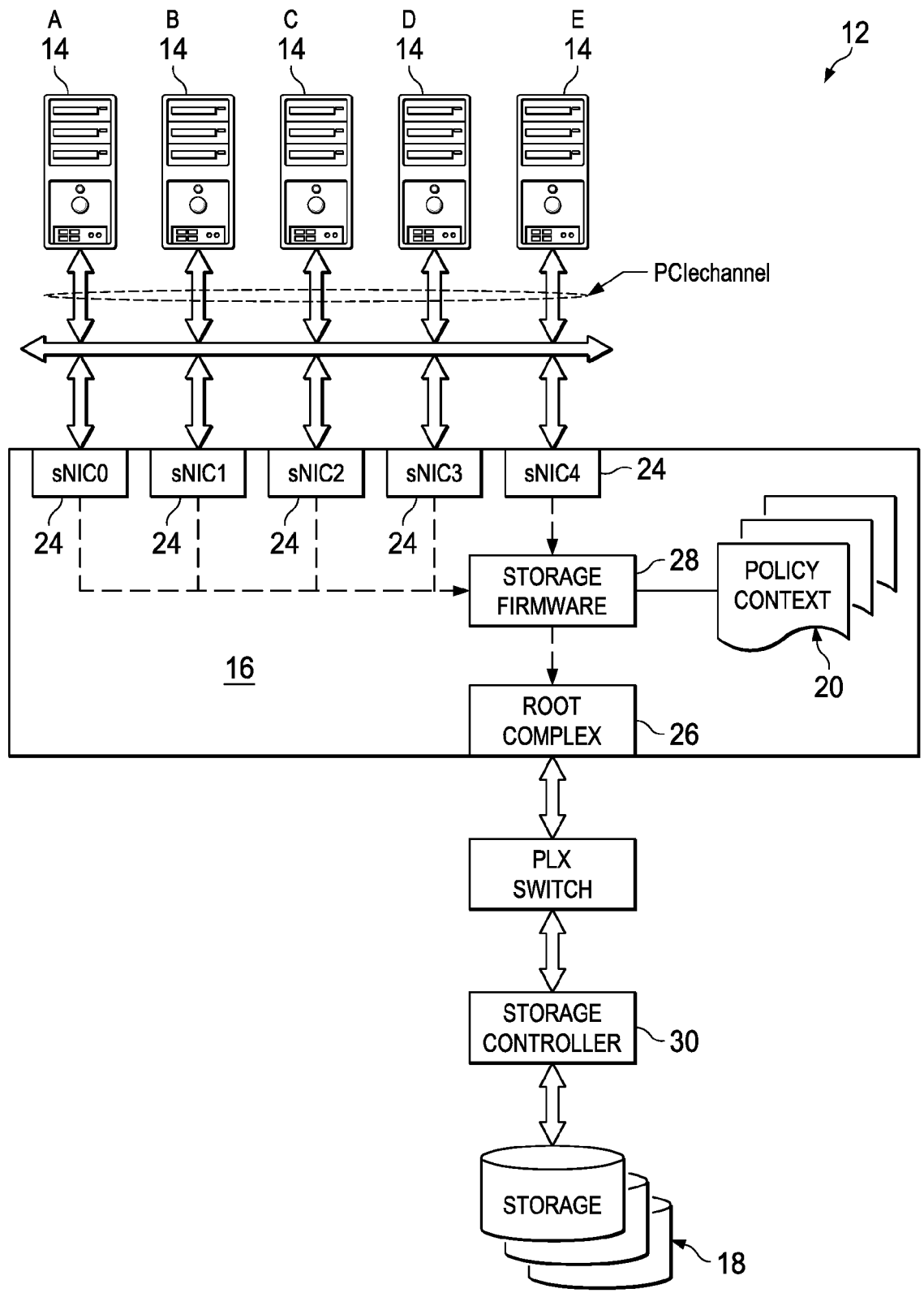
FIG. 1B is a simplified block diagram illustrating example details of an embodiment of the communication system.

Turning to FIG. 1B, FIG. 1B is a simplified diagram illustrating various components facilitating operations of communication system 10 within microserver chassis 12. Compute nodes 14 are referred in the figure as "A", "B", "C" and so on. Each compute node 14 is associated with a separate Small Computer System Interface (SCSI) network interface card (sNIC) 24. sNICs 24 are referred in the figure as "sNIC0", "sNIC1", "sNIC2" and so on. Note that the label "24" may refer to a single sNIC, or it may refer to a plurality of sNICs without affecting the meaning or scope of the embodiments. In various embodiments, each sNIC 24 may comprise a portion of an Application Specific Integrated Circuit (ASIC) with a unique PCIe physical function, such as enabling connectivity of associated compute node 14 to a portion of shared storage resource 18.

A System Link Technology™ executing in communication system 10 enables creation of PCIe physical functions represented by sNICs 24. Any one sNIC 24 presents a PCIe storage endpoint comprising a virtual storage controller to the operating system of the respective compute node 14 and maps storage resource 18 to a specific service profile within the UCS manager (e.g., executing in or through upstream switch 22). For example, sNIC0 presents a virtual storage controller to the operating system of compute node A and maps storage resource 18 to a specific service profile within the UCS manager associated with compute node A. Similarly, sNIC1 presents a virtual storage controller to the operating system of compute node B and maps storage resource 18 to a specific service profile within the UCS manager associated with compute node B; and so on.

I/O adapter 16 creates sNICs 24 based on administrator provided policies at switch 22. sNICs 24 allow respective ones of compute nodes 14 to have their own specific virtual drive carved out of the available physical drives within microserver chassis 12. The communication between the operating system to the drive is via standard SCSI commands. sNICs 24 comprise PCIe endpoints claimed by SCSI host drivers of respective compute nodes 14. The UCS manager at switch 22 provisions storage on shared storage resource 18 and exports LUNs to compute nodes 14 via respective sNICs 24.

A root complex 26 of the PCIe bus of microserver chassis 12 enables connectivity to a PLX switch (optional) and a storage controller 30, which connects to various shared storage devices (SSD) comprising storage resource 18. In various embodiments, shared storage controller 30 comprises any off-the-shelf storage controller from any suitable vendor. The PLX switch is optional, and may be used to extend the number of shared storage controllers that can be attached to the PCIe bus. Storage firmware 28 executing in I/O adapter 16 maintains per sNIC policy contexts, indicative of active policies for corresponding compute nodes 14 as specified in policy context 20. In some embodiments, the centralized UCS manager provisions LUNs for compute nodes 14 using out of band management interface over an Inter-Integrated Circuit (I2C) bus. I/O adapter 16 samples the I/O traffic originating from sNICs 24 to various LUNs on storage resource 18 and generates (and maintains) counters per sNIC interface or optionally per sNIC and per LUN (e.g., <sNIC, LUN>).

According to various embodiments, shared storage controller 30 exposes a command ring comprised of an array of command descriptors (of SCSI commands) to storage firmware 28. Each command descriptor contains SCSI command related information, address pointers to data buffers in shared storage resource 18 and a variety of control information. The command ring comprises a circular buffer comprising the command descriptors. Embodiments of communication system 10 allocate tokens to command descriptors associated with I/O operations for accessing shared storage resource 18 (e.g., tokens represent command descriptors). In an example embodiment, storage firmware 20 allocates the token to the command descriptors.

For example, each command descriptor in the command ring is represented as a token associated with the corresponding I/O operation (e.g., SCSI command). As used herein, "token" is a special series of bits that travels around a token-ring buffer, such as the command ring. As the token circulates, packet processors in I/O adapter 16 can capture it. The token acts like a ticket, enabling its owner (e.g., marked SCSI command) to be executed. In some embodiments, only one token is associated with each I/O operation that accesses a specific portion of shared storage resource 18. The tokens are managed in a common resource pool and an arbiter routine (e.g., software code, microcode, computer program, process, thread, instructions, etc.) of storage firmware 28 assigns the tokens to corresponding I/O commands.

Any suitable token management protocol may be used within the broad scope of the embodiments. For example, the tokens are distributed by the token ring: each cycle a packet processor's thread interface unit (TIU) passes on a token to the right and receives one from the left. Two basic instructions are provided for ring management: the first instruction requests a token; the processor removes a token from the ring, if one is available, and places it in the requesting thread's context. The requesting thread is then allowed to fork and jump, much like a subroutine call. When the thread terminates, the second instruction releases the token back into the ring. In a general sense, only SCSI command holding the token (e.g., marked with the token) can access the shared storage resource 18. In some embodiments, the token specifies an index to be used in the command ring of shared storage controller 30.

For every I/O command, the arbiter routine decides to award or deny the token for that I/O command based on token availability in the command ring and policy context 20 for corresponding sNIC 24. If the arbiter routine awards the token, a data processor in I/O adapter 16 initiates a command request by posting the I/O command in the command queue of shared storage controller 30. In various embodiments, the data processor executes storage firmware 28. If arbiter routine denies the token due to unavailability or based on policy context 20, the data processor returns a "BUSY" status for that I/O command.

Shared storage controller 30 notifies the data processor of completion of the I/O command. The data processor forms a I/O completion notification and forwards it to relevant compute node 14 that initially issued the SCSI command. The arbiter routine monitors the I/O completion notifications and returns the token back to the common token pool. Each sNIC 24 provides a pair of (i) command queue and (ii) response queue for issuing I/O commands to shared storage controller 30 and also for receiving I/O completion notifications. Moreover, I/O adapter 16 gathers storage I/O statistics and token arbitration without impacting data path performance. In some embodiments, the administrator can change the storage QoS policy even when compute nodes 14 are operational and I/Os are active. Policy changes are communicated to storage firmware 28 via VIC protocol control messages and are validated before being enforced.

Turning to the infrastructure of communication system, network topology of the network including microserver chassis 12 can include any number of compute nodes, servers, hardware accelerators, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, microserver chassis 12 may comprise a rack-mounted enclosure, blade enclosure, or a rack computer that accepts plug-in compute nodes 14. Note that microserver chassis 12 can include, in a general sense, any suitable network element, which encompasses computers, network appliances, servers, routers, switches, gateways, bridges, load-balancers, firewalls, processors, modules, or any other suitable device, component, element, or object operable to exchange information in a network environment. Moreover, the network elements may include any suitably configured hardware provisioned with suitable software, components, modules, interfaces, or objects that facilitate the operations thereof. This may be inclusive of appropriate algorithms and communication protocols that allow for the effective exchange of data or information.

Compute nodes 14 may comprise printed circuit boards, for example, manufactured with empty sockets. Each printed circuit board may hold more than one processor (e.g., within the same processor family, differing core counts, with a wide range of frequencies and vastly differing memory cache structures may be included in a single processor/socket combination). In some embodiments, each compute node 14 may comprise one or mode central processing unit (CPU) and memory with standard PCIe connectivity to chassis resources, including storage resource 18. Components shared in microserver chassis 12 includes power, management, cooling, storage and networking.

I/O adapter 16 may include an electronic circuit, expansion card or plug-in module that accepts input and generates output in a particular format. I/O adapter 16 facilitates conversion of data format and electronic timing between input/output streams and internal computer circuits of microserver chassis 12. In an example embodiment, I/O adapter 16 comprises five Microprocessor without Interlocked Pipeline Stages (MIPS) processors, with one of them executing control firmware and the remaining handling the storage data path.

Embodiments of communication system 10 facilitate achieving both minimum bandwidth utilization and maximum bandwidth utilization of shared storage resource 18 by compute nodes 14 within microserver chassis 12. Further, various policy enforcement operations described herein are performed on sNICs 24 without manual intervention or any intervention by compute nodes 14. In other words, the policy enforcement is transparent to compute nodes 14.

Whereas communication system 10 has been described with reference to a microserver computing environment, it will be appreciated that the operations described herein can be executed at any network level wherein a plurality of computing devices access shared storage resources. For example, the operations performed by I/O adapter 16 may be extended to execute at switch 22. Thus, the operations described herein may be applied to a storage area network (SAN) environment with servers in physically distinct chassis sharing storage resources in the SAN. Policy enforcement using tokens, and per-sNIC policy contexts, etc. as described herein may be performed at switch 22 connecting the servers in such scenarios.

The number of applications running in a typical data center is growing exponentially. With this, the demand for servers and network infrastructure is also constantly growing. Massively Scalable Data Centers are being hosted by various cloud providers. The microserver architecture allows use of more compute nodes using less physical space.

For efficient management of such microserver infrastructure, it is desirable to consolidate management planes at single point of control, as is possible with embodiments of communication system 10. Also, different treatment of storage traffic based on the workload and application performance is possible through enforcement of appropriate policy contexts 20. Embodiments of communication system 10 allow defining a storage QoS policy from centralized management software in switch 22 and dynamically updating the QoS based on demand and requirements.

Figure 2:
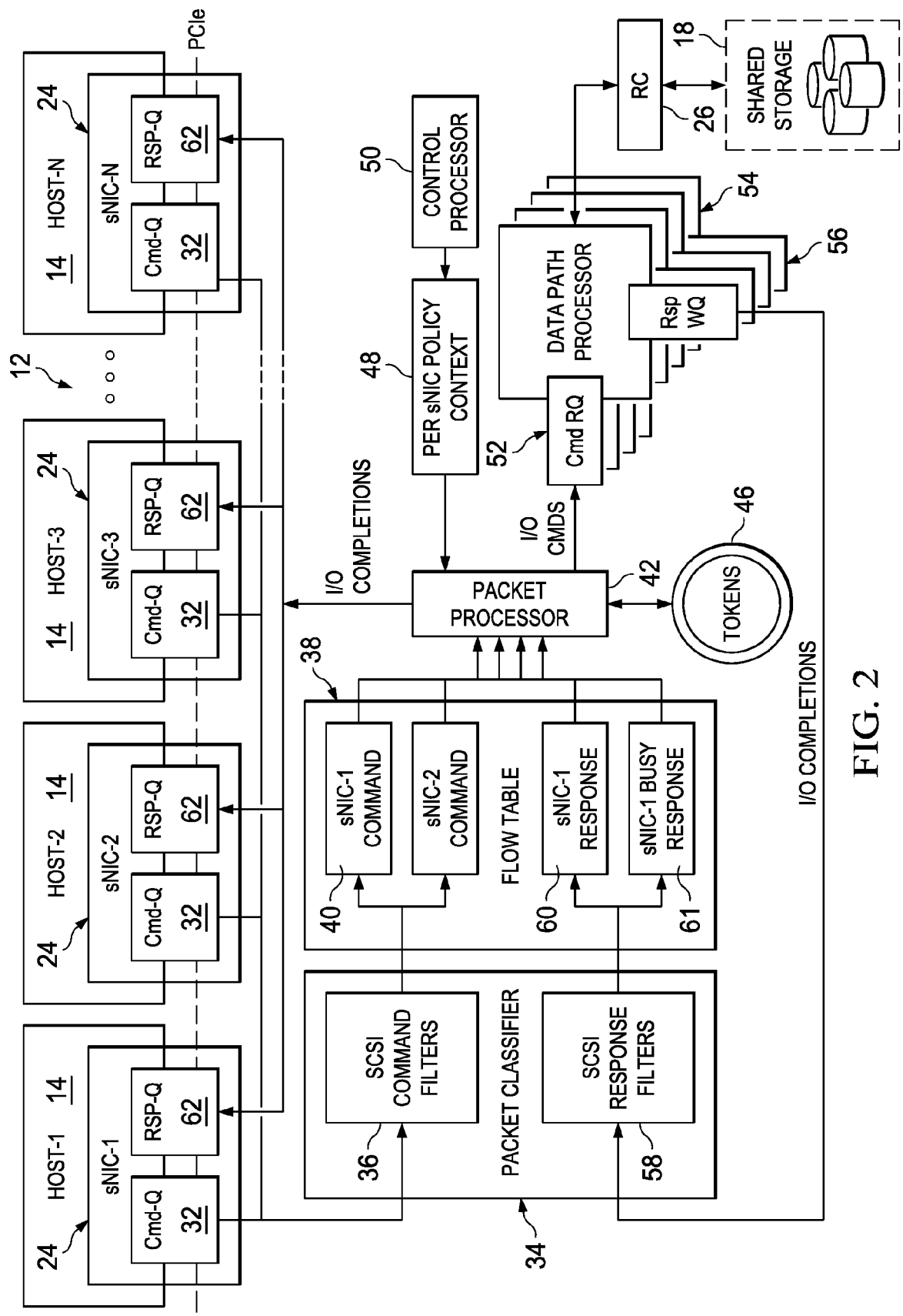
FIG. 2 is a simplified block diagram illustrating other example details of embodiments of the communication system.

Turning to FIG. 2, FIG. 2 is a simplified block diagram illustrating example details of microserver chassis 12 according to an embodiment of communication system 10. Embodiments of communication system 10 facilitate improvement of existing VIC protocol to communicate per compute node storage QoS policies using various functional blocks to sample per compute node or per sNIC I/O statistics without adding latency. Compute nodes 14 are referred in the figure as Host-1 through Host-N. For simplicity's sake, example details associated with a single compute node, namely Host-1 are described further. Note that the description is equally applicable to all of compute nodes 14.

Host-1 is associated with a particular sNIC 24, namely, sNIC-1, provisioned with a command queue 32, to which a host driver of an application executing in Host-1 posts a I/O operation (e.g., SCSI command), such as a read command, or a write command as a SCSI packet through sNIC-1. Command queue 32 may be provisioned in sNIC-1 associated with Host-1 by a control firmware, which forms a portion of storage firmware 28. sNIC-1 may encapsulate the SCSI packet in an Ethernet packet with an appropriate Ethernet header. A packet classifier 34 in I/O adapter 16 filters the Ethernet packet using appropriate SCSI command filters 36. In some embodiments, packet classifier 34 filters the Ethernet packet based on its Layer 2 (L2) to Layer 5 (L5) header fields.

The filtered result comprises a key which can be used to index into a flow table 38, which includes a plurality of entries associated with SCSI commands corresponding to sNICs 24, among other parameters. In the example shown, flow table entry 40 is associated with a SCSI command corresponding to sNIC-1. Flow table 38 facilitates recording storage traffic in microserver chassis 12 based on suitable match criteria for further analysis. In a general sense, flow table 38 may be used to track packet flows based on suitable match criteria applied to header fields in the Ethernet packets' L2-L5 headers. In some embodiments, flow table 38 provides a secondary look up table after packets are filtered at packet classifier 34. In some embodiments, any match in flow table 38 updates associated statistics in hardware (e.g., ASIC) in I/O adapter 16. The statistics include packet count, byte count and latest timestamp. In some embodiments, each flow table entry is also associated with an action field, such as forwarding the packet to a suitable queue, or executing an appropriate microcode routine.

Note that packet classifier 34 and flow table 38 classify and track Ethernet packets. In a general sense, packet classifier 34 and flow table 38 are generally available in any I/O adapter and are configured typically for Ethernet packet processing. Such general purpose packet classifier 34 and flow table 38 can be modified according to embodiments of communication system 10 to include appropriate filters to filter (e.g., identify, screen, etc.) SCSI commands and responses (e.g., containing CDB and LUN information) formatted as Ethernet packets with a reserved internal Ether type.

In various embodiments, the flow table lookup of the filtered result from packet classifier 34 triggers execution of an arbiter routine (or other such action) in a packet processor 42. In an example embodiment, packet processor 42 processes packets on ingress or egress paths per Uplink InterFace (UIF) of I/O adapter 16. In some embodiments, the arbiter routine comprises various special microcode routines (also known as Rewrite Rules). which are executed in packet processor 42 to modify contents of the packets and to further perform other actions.

The arbiter routine, which can comprise a microcode routine in some embodiments, decides to award or deny a token to the SCSI command from sNIC-1 based on token availability in a common token pool 46 and according to a per sNIC policy context 48. Common token pool 46 contains tokens allowing I/O commands to be executed or returned back to the host with a BUSY/QUEUE FULL status. In various embodiments, common token pool 46 is derived from the command ring provided by shared storage controller 30. The command descriptors of the command ring are managed as resources and allocated from common token pool 46.

According to an example embodiment, common token pool 46 comprises a circular buffer marked by a producer and consumer index. The arbiter routine awards tokens to the SCSI commands from the circular buffer. The arbiter routine also returns tokens back to common token pool 46 after I/O command completion. In various embodiments, a single packet processor 42 manages the award and return of tokens from and to common token pool 46.

In various embodiments, per sNIC policy context 48 is derived by a control processor 50 from policy context 20 in some embodiments. Per sNIC policy context 48 holds per sNIC storage access parameters of sNICs 24 configured according to policy context 20 received from switch 22 at I/O adapter 16. In an example embodiment, the per sNIC storage access parameters comprise maximum bandwidth, minimum bandwidth or maximum IOPS associated with storage traffic. In various embodiments, control processor 50 comprises a MIPS based processor executing control path firmware. The control path firmware executing in control processor 50 configures sNICs 24 and shared storage resource 18 mapped to compute nodes 14, handles VIC protocol communication between I/O adapter 16 and the UCS manager executing on switch 22, and handles requests from host drivers to change states of sNICs 24.

In one example, the administrator specifies values of various storage access parameters for each compute node 14 in policy context 20; control processor 50 retrieves the association of each compute node 14 with its corresponding sNIC 24 (e.g., Host-1 is associated with sNIC-1); control processor 50 applies the various storage parameters specified in policy context 20 with corresponding sNIC 24 based on the retrieved association. In another example, the administrator specifies values of various storage access parameters for groups of compute nodes 14 (e.g., compute nodes 14 executing web applications can use a maximum of x amount of bandwidth; compute nodes 14 executing database applications must have a minimum of y amount of bandwidth; etc.) in policy context 20. Control processor 50 identifies compute nodes 14 in the respective groups, retrieves association of each identified compute node 14 with its corresponding sNIC 24, and applies the various storage parameters specified in policy context 20 with corresponding sNIC 24 based on the retrieved association. Note that the groups of compute nodes 14 can be based on any suitable criterion, such as applications, users, authentication parameters, user roles, compute node hardware, etc. within the broad scope of the embodiments.

Turning back to operations on the Ethernet packet from sNIC-1, the arbiter routine executing in packet processor 42 strips the Ethernet header off the Ethernet packet (using any suitable stripping procedure known in the art) and posts the SCSI command into a command response queue (RQ) 52 at a data path processor 54. In various embodiments, data path processor 54 comprises a MIPs based processor in I/O adapter 16. If the token has been awarded, the I/O command is forwarded to shared storage controller 30 through root complex 26. Root complex 26 provides connectivity to storage controller 30 over a PCIe interface. The DMA operation associated with the I/O command is carried out directly between storage controller 30 and Host-1 over a PCIe bus.

Resources (e.g., command ring) of storage controller 30 are directly mapped to a VIC address space (e.g., memory space) in I/O adapter 16; control path and data path firmware running on various MIPS processors (e.g., data path processor 54) in I/O adapter 16 can access the memory mapped space to issue the I/O commands. Storage controller 30 can perform DMA to or from server address spaces (in memory) using suitably specialized hardware (e.g., ternary content addressable memory (TCAM) table).

Data path processor 54 is notified when the I/O operation is complete. For example, I/O completion interrupts are mapped to data path processor 54, which thereafter generates a completion event to be sent to Host-1. Data path processor 54 creates a I/O completion notification indicating completion of the SCSI command from sNIC-1 and posts the I/O completion notification in a response work queue (WQ) 56. The I/O completion notification is encapsulated in an appropriate Ethernet packet having a suitable Ethernet header according to embodiments described herein.

Packet classifier 34 filters the Ethernet header according to SCSI response filters 58. The result of the filtering comprises a key that is used as an index into flow table 38. The Ethernet response packets are matched with appropriate response entries 60 corresponding to sNIC-1 associated with the I/O completion notification. Had the I/O completion notification been an indication of "BUSY" or "QUEUE FULL" status, another appropriate busy response entry 61 corresponding to sNIC-1 provides the requisite match. Any match in flow table 38 triggers execution of an appropriate arbiter routine in packet processor 42. The arbiter routine returns the token associated with the I/O command to common token pool 46 and posts the I/O completion notification in a response queue 62 of Host-1.

In various embodiments, the arbiter routine indicated in flow table 38 varies according a type of the SCSI packet. If the SCSI packet encapsulated in the Ethernet packet comprises a SCSI command, the arbiter routine determines if policy context 20 permits a token fetch; if the policy context permits the token fetch, the arbiter routine attempts to fetch one of the tokens from common token pool 46. On the other hand, if the SCSI packet encapsulated in the Ethernet packet comprises a SCSI response, the arbiter routine increments a hit counter in flow table 38 indicative of a number of I/O operations completed for sNIC-1 of Host-1, decapsulates the Ethernet packet and forwards the SCSI response to sNIC-1. Further, if the SCSI packet encapsulated in the Ethernet packet comprises a SCSI busy response indicating token unavailability, the arbiter routine decapsulates the Ethernet packet and forwards the SCSI busy response to sNIC-1.

Figure 3:
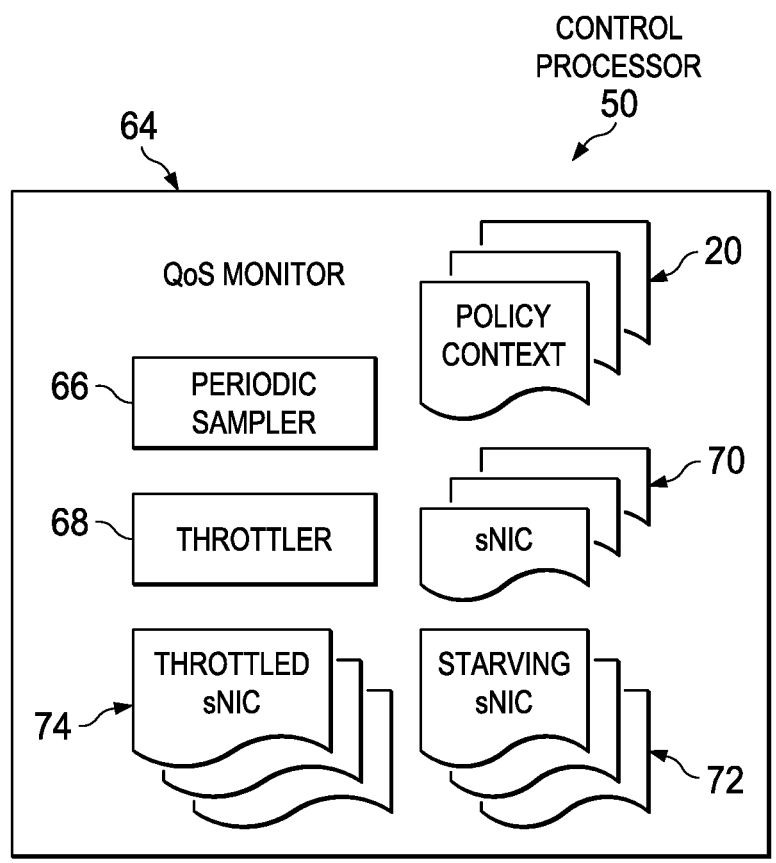
FIG. 3 is a simplified block diagram illustrating yet other example details of embodiments of the communication system.

Turning to FIG. 3, FIG. 3 is a simplified diagram illustrating example details of control processor 50 according to an embodiment of communication system 10. In a general sense, control path firmware initializes various flow table entries (e.g., 40, 60, 61) in flow table 38 and filters (e.g., 36, 58) in packet classifier 34 based on the QoS policies defined for associated sNIC 24 in policy context 20. The control path firmware calculates the maximum and minimum threshold tokens and maximum IOPS during implementation of I/O commands.

The control path firmware initializes a QoS monitor 64, which runs periodically on control processor 50. QoS Monitor 64 administers system-wide QoS policies across sNICs 24 and/or compute nodes 14. QoS Monitor 64 has a global view of the total load on shared storage resource 18, including visibility to current bandwidth utilization of various sNICs 24 and policy context 20. As an example, a monitor thread (e.g., sequence of instructions) of QoS monitor 64 can make decisions to provide guaranteed bandwidth for sNICs 24, which request such guaranteed bandwidth. QoS monitor 64 includes two monitor threads: a low frequency (e.g., once a second) periodic sampler 66 and a higher frequency throttler 68. QoS monitor 64 also maintains a sNIC list 70, comprising a list of sNICs 24 in microserver chassis 12.

Periodic sampler 66 samples the I/O operations being executed and updates the per sNIC IOPS parameter in flow table 38. Throttler 68 is scheduled to run at a higher frequency if low frequency periodic sampler 66 detects violations of policy context 20. High frequency throttler 68 attempts to correct the violations by dynamically throttling and un-throttling sNICs 24.

During operation, periodic sampler 66 samples flow table entries (e.g., 40, 60, 61) for sNICs 24 in flow table 38. Periodic sampler 66 measures IOPS based on the number of I/O completions sampled in successive runs. For sNICs 24 that have requested bandwidth reservation according to associated policy context 20, a "starve counter" is examined in the corresponding flow table entry. If the starve counter is 0, nothing is done. On the other hand, a non-zero starve counter, and/or a number of outstanding token count lower than a minimum threshold token indicates starvation (e.g., unavailability of requested bandwidth reservation). The sNIC is considered as a "starving sNIC" and added to a starving sNIC list 72. In an example embodiment, periodic sampler 66 identifies substantially all starving sNICs in a single sweep (e.g., execution) and schedules throttler 68 to handle the situation.

In various embodiments, high frequency throttler 68 is invoked on demand, and it executes at a higher frequency (than periodic sampler 66) until the starving situation is remedied and the violation of policy context 20 disappears. In an example embodiment when it is invoked, throttler 68 is scheduled to execute every 100 ms until starving sNICs 24 are no longer starved. In various embodiments, throttler 68 make a list of sNICs 24 that can be throttled and lists such sNICs in a throttled sNIC list 74. sNICs 24 may be listed in throttled sNIC list 74 based on several criteria: for example, sNICs 24 without any associated policy context may be added to throttled sNIC list 74; sNICs 24 that have relatively lower priority according to policy context 20 may be added to throttled sNIC list 74 (e.g., low priority sNICs are added before normal priority sNICs); sNICs having a "Max IOPS" (0x01) policy type or "Max Bandwidth utilization" (0x02) policy type may be added to throttled sNIC list 74; sNICs having lower bandwidth requirement and not experiencing any violation of respective per sNIC policy context 48 may be added to throttled sNIC list 74; and so on. The operating state of such sNICs added to throttled sNIC list 74 may be set to "PAUSED".

In an example embodiment, the state of starved sNICs may be checked after a predetermined wait period (e.g., 100 ms). If the situation has not improved (e.g., number of starved sNICs remains the same; or the same set of sNICs continue to be starved; etc.), additional sNICs may be added to throttled sNIC list 74. The operations may continue until previously starved sNICs 24 are able to perform I/O operations at a desired (e.g., guaranteed) bandwidth utilization. Thereupon, high frequency throttler 68 ceases to reschedule itself and terminates its operation. In some embodiments, before terminating, high frequency throttler 68 also updates QoS monitor 64 to indicate completion of the throttling task.

In various embodiments, periodic sampler 66 detects during execution that certain sNICs 24 are being throttled; thereupon, periodic sampler 66 monitors the condition of such sNICs 24 that have minimum (e.g., guaranteed, required, etc.) bandwidth requirement. If all sNICs 24 are able to perform I/O operations at the minimum (e.g., guaranteed, required, etc.) bandwidth utilization, periodic sampler 66 starts unblocking sNICs 24 by traversing the throttled sNIC list 74 in the reverse order. In some embodiments, low frequency periodic sampler 66 unblocks only a subset of throttled sNICs to avoid overload on communication system 10. Periodic sampler 66 also monitors the current starvation situation and stops the unblock operation if it detects that some (or at least one) sNICs 24 are starved. Embodiments of communication system 10 can facilitate achieving both minimum and maximum bandwidth utilization of shared storage resource 18 without any intervention from compute nodes 14 or the administrator.

Figure 4:
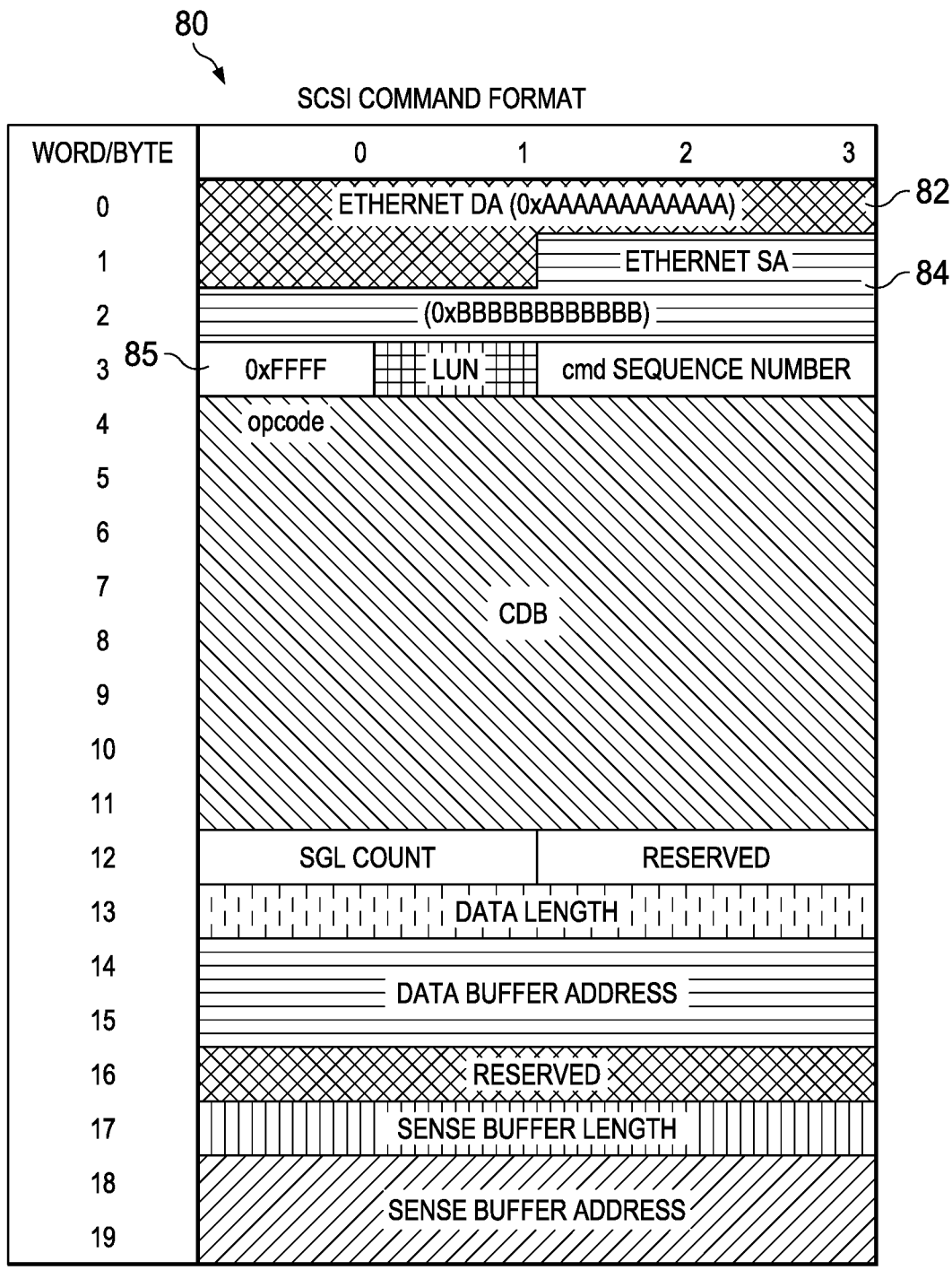
FIG. 4 is a simplified block diagram illustrating yet other example details of embodiments of the communication system.

Turning to FIG. 4, FIG. 4 is a simplified diagram illustrating example details of an Ethernet command packet 80 comprising a SCSI command according to an embodiment of communication system 10. The platform dependent host driver registers with a SCSI mid layer to receive SCSI I/O commands. The host driver discovers LUNs configured in storage resource 18 during initialization and presents them to the SCSI mid layer. The mid layer sends an I/O command to storage resource 18 by passing a SCSI Command Descriptor Block (CDB) and associated buffers for receiving data and status. The host driver encapsulates the SCSI command in the format shown in the FIGURE.

The SCSI CDB and other command parameters are encapsulated in Ethernet command packet 80. Ethernet command packet 80 uses a fake preset destination Media Access Control (MAC) address 82, source MAC address 84, and Ethertype 85 to indicate its status as a SCSI command. In an example, source and destination MAC addresses 84 and 82 respectively, comprise unique MAC addresses (e.g., 0xBBBBBBBBBBBB and 0xAAAAAAAAAAAA, respectively); Ethertype 85 comprises a value of 0xFFFF. Values of source MAC address 84 and destination MAC address 82 and Ethertype 85 are programed in packet classifier 34 to trap Ethernet command packet 80. For example, a value of 0xBBBBBBBBBBBB in source MAC address 84 and a value of 0xAAAAAAAAAAAA in destination MAC address 82 indicate that Ethernet command packet 80 encapsulates a SCSI command.

Ethernet command packet 80 can also include various other fields and corresponding values. For example, an opcode field is one byte long and indicates if the command is READ/WRITE or any other control command according to SCSI specifications. A CDB field can be 6, 10, 12 and 16 bytes based on the size of data transfer or logical block addressing (LBA) being accessed. The CDB field is followed by a data buffer consisting of write data or space where READ data is copied. Ethernet command packet 80 also carries information about a sense buffer to handle termination of the command with a check condition. A reserved field of 4 bytes, which is not updated by the host driver may also be provided to be used by the arbiter routine to record the token for that I/O operation. The host driver forms Ethernet command packet 80 and posts it on command work queue (e.g., 32). Ethernet command packet 80 is passed through packet classifier 34 on its way to data path processor 54, where it is processed and the I/O request is forwarded to shared storage controller 30.

Figure 5:
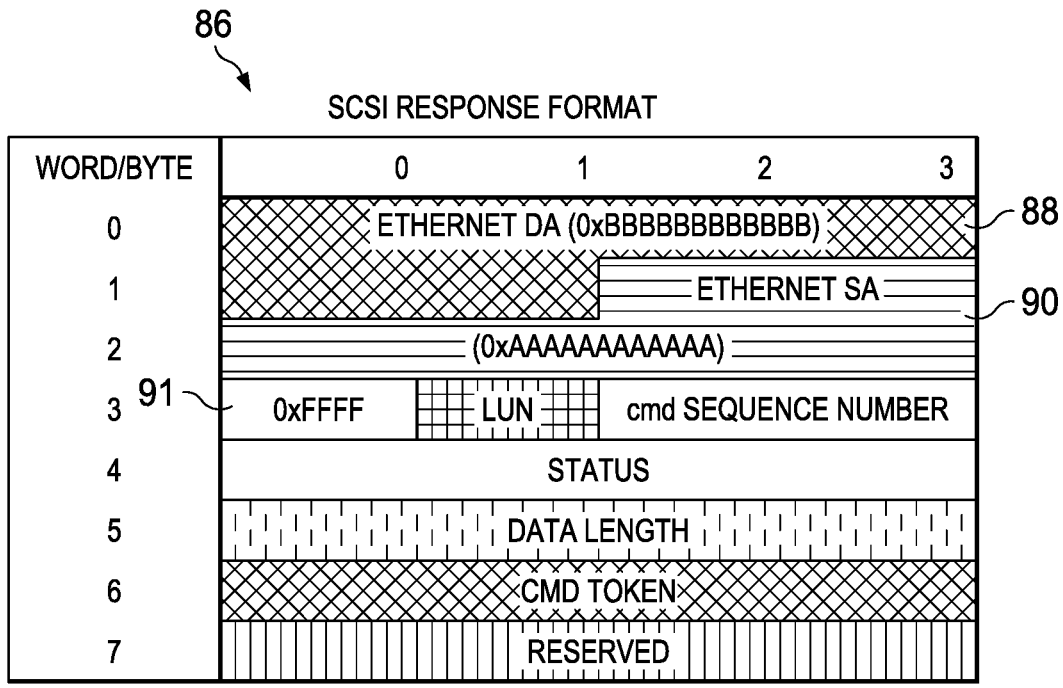
FIG. 5 is a simplified block diagram illustrating yet other example details of embodiments of the communication system.

Turning to FIG. 5, FIG. 5 is a simplified diagram illustrating example details of an Ethernet response packet 86 comprising a SCSI response according to an embodiment of communication system 10. Ethernet response packet 86 uses a fake preset destination MAC address 88, source MAC address 90, and Ethertype 91 to indicate its status as a SCSI response. In an example, destination and source MAC addresses 88 and 90 respectively comprise unique MAC addresses (e.g., 0xBBBBBBBBBBBB and 0xAAAAAAAAAAAA, respectively); value of Ethertype 91 comprises 0xFFFF. Values of source MAC address 90, destination MAC address 88 and Ethertype 91 are programed in packet classifier 34 to trap Ethernet response packet 86. For example, a value of 0xBBBBBBBBBBBB in destination MAC address 88 and a value of 0xAAAAAAAAAAAA in source MAC address 90 indicate that Ethernet response packet 86 encapsulates a SCSI response.

According to various embodiments, the I/O completions are formed by firmware executing on data path processor 54. Shared storage controller 30 notifies data path processor 54 after completion of a SCSI command. The firmware finds the associated SCSI command request and forms (e.g., generates, creates, etc.) Ethernet response packet 86 with fields as indicated in the figure. The firmware also places the token (CMD token) and sends the I/O completion notification comprising Ethernet response packet 86 on its response WQ 56. The I/O completion notification passes through packet classifier 34 and flow table 38 and is processed suitably as described herein.

Figure 6:
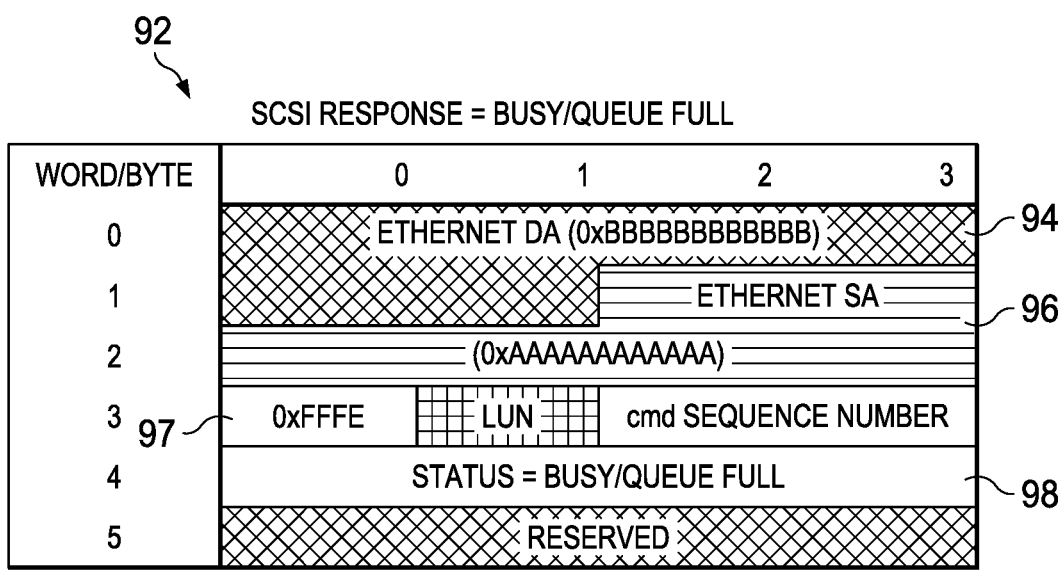
FIG. 6 is a simplified block diagram illustrating yet other example details of embodiments of the communication system.

Turning to FIG. 6, FIG. 6 is a simplified diagram illustrating example details of an Ethernet BUSY packet 92 according to an embodiment of communication system 10. During operation, when the firmware detects that there are no command descriptors to post the SCSI command, either because tokens are not available in common token pool 46, or per sNIC policy context 48 does not permit execution of the SCSI command, the firmware returns a BUSY/QUEUE FULL status back to the host driver using Ethernet BUSY packet 92. Ethernet BUSY packet 92 uses a fake destination MAC address 94, source MAC address 96, and Ethertype 97 to indicate its status as a SCSI response. In an example, destination and source MAC addresses 94 and 96 respectively comprise unique MAC addresses (e.g., 0xBBBBBBBBBBBB and 0xAAAAAAAAAAAA, respectively); value of Ethertype 97 comprises 0xFFFE. Values of source MAC address 96 and destination MAC address 94 and Ethertype 97 are programed in packet classifier 34 to trap Ethernet BUSY packet 92. A status field 98 in Ethernet BUSY packet 92 indicates the BUSY/QUEUE FULL status.

Turning to FIG. 7, FIG. 7 is a simplified diagram illustrating example details of packet classifier 34 according to an embodiment of communication system 10. Though SCSI command is processed by one of the data path processor, the firmware running on the control processor is responsible for sampling and aggregating the IOPS and throughput measurements periodically. Packet classifier 34 includes a filter field, a filter identifier (ID) field, and an action field. The SCSI commands issued by the host matches the SCSI command filter as configured in packet classifier 34. Example SCSI command filter 36 corresponds to certain destination MAC address value (e.g., 0xAAAAAAAAAAAA), source MAC address value (e.g., 0xBBBBBBBBBBBB) and Ethernet type (e.g., 0xFFFF). The filter ID value (e.g., 1) indicates that the filter is applied to a SCSI command packet. The action field indicates that flow table 38 is to be looked up. Example SCSI response filter 58 corresponds to certain destination MAC address value (e.g., 0xBBBBBBBBBBBB), source MAC address value (e.g., 0xAAAAAAAAAAAA) and Ethernet type (e.g., 0xFFFF). The filter ID value (e.g., 2 or 3) indicates that the filter is applied to a SCSI response packet or SCSI BUSY response packet; Ethertype (e.g., 0xFFFF or 0xFFFE) distinguishes a SCSI response packet from a SCSI BUSY response packet. The action field indicates that flow table 38 is to be looked up.

Figure 8:
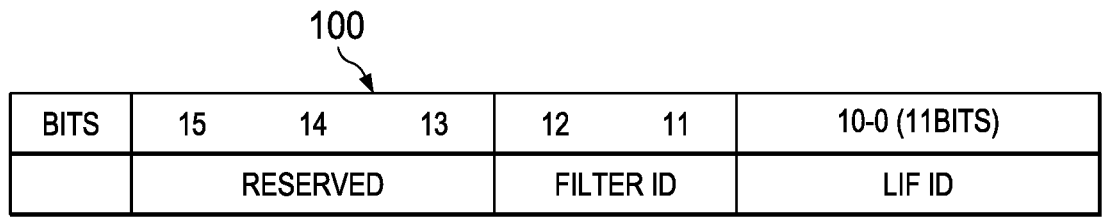
FIG. 8 is a simplified block diagram illustrating yet other example details of embodiments of the communication system.

Turning to FIG. 8, FIG. 8 is a simplified diagram illustrating example details of a key 100 returned by packet classifier 34 after filtering the Ethernet packets comprising SCSI commands or SCSI responses (including SCSI busy responses) according to an embodiment of communication system 10. Key 100 to index into flow table 38 is formed by two parameters, filter ID and Logical Interface (LIF) ID. The filter ID identifies a classification type (e.g., command, response, busy) of the I/O operation. The LIF ID identifies the particular Host-1 or sNIC-1 associated with the I/O operation (e.g., which has issued the command or to which the response is destined). In an example embodiment, key 100 comprises a 13-bit key to a flow entry in flow table 38; the flow entry is 64 bytes wide, resulting in a flow table of size 512 KB.

Figure 9:
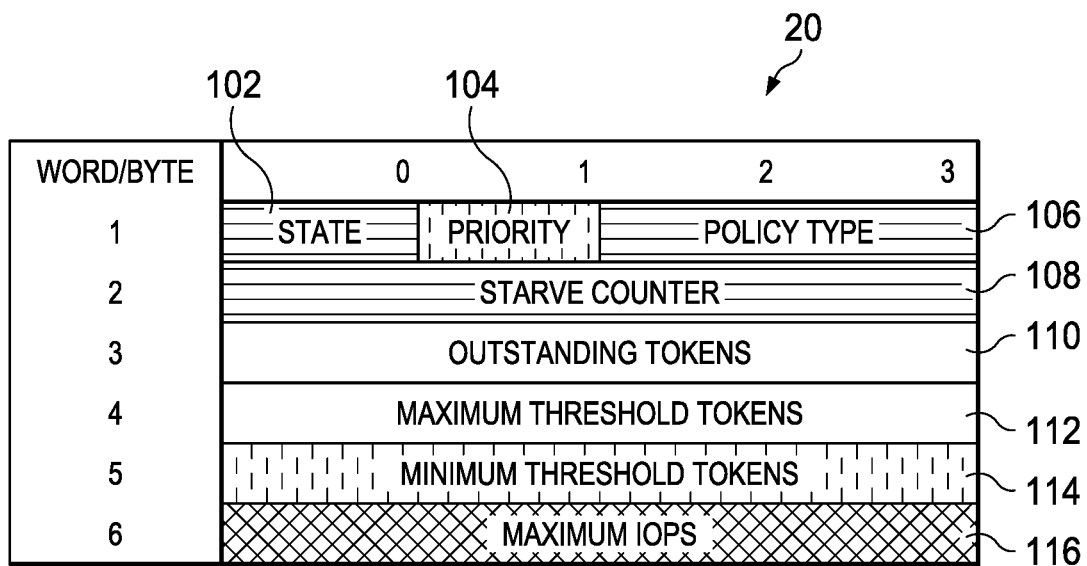
FIG. 9 is a simplified block diagram illustrating yet other example details of embodiments of the communication system.

Turning to FIG. 9, FIG. 9 is a simplified diagram illustrating example details of policy context 20 according to an embodiment of communication system 10. In various embodiments, the administrator can define storage QoS policies per compute node on a suitable GUI of UCS manager. Policy context 20 corresponding to each sNIC 24 and/or compute node 14 (e.g., sNIC-1, or Host-1) may comprise a state field 102, a priority field 104 and a policy type field 106. Note that although the example details are described in relation to particular sNIC-1 and/or Host-1, the description is equally applicable to any of sNICs 24 and/or compute nodes 14.

State field 102 indicates if I/O operations for associated sNIC-1 are "PAUSED" or "NOT PAUSED" (e.g., operational). sNIC-1 with a state of PAUSED is to be throttled. Priority field 104 indicates one of priorities "High," "Normal" and "Low" (note that any suitable number of priorities may be specified to indicate relative importance of associated sNIC-1 among a plurality of sNICs 24). The value of priority field 104 indicates the relative priority of associated sNIC-1 and it is used to determine whether particular sNIC-1 should be throttled in the event of over subscription. The administrator sets the value of priority field 104.

Policy type field 106 may indicate, merely as examples and not as limitations, maximum IOPS, maximum bandwidth utilization, minimum bandwidth guarantee, maximum IOPS+minimum bandwidth guarantee, and maximum bandwidth allowed+minimum bandwidth guaranteed. The policy types may be identified by label values, for example: policy type label=0x01 corresponds to maximum IOPS allowed for associated sNIC-1 (or Host-1); policy type label=0x02 corresponds to maximum bandwidth utilization allowed, specifying a maximum percentage utilization of shared storage resource 18 that can be used by associated sNIC-1 (or Host-1); policy type label=0x04 corresponds to minimum bandwidth utilization guaranteed, specifying a minimum percentage utilization of shared storage resource 18 to be reserved for associated sNIC-1 (or Host-1); policy type label=0x05 corresponds to maximum IOPs allowed and minimum bandwidth guaranteed for associated sNIC-1 (or Host-1); and policy type label=0x06 corresponds to maximum bandwidth allowed and minimum bandwidth guaranteed for associated sNIC-1 (or Host-1). Policy types 0x01 and 0x02 specify an upper ceiling for the storage utilization, whereas policy 0x06 defines a lower ceiling. For given sNIC-1 (or Host-1), the administrator can also specify a minimum value and a maximum value combination (e.g., <MIN, MAX>) to define both upper and lower limits. Policy type labels indicated herein (e.g., 0x01, 0x02, etc.) are arbitrary, and could include any suitable alphanumeric identifier within the broad scope of the embodiments.

Policy context 20 further includes a starve counter 108, denoting a count of I/O commands that had to be busied continuously due to lack of tokens. When a specific I/O command is awarded a token, starve counter field 108 is set to zero. Otherwise, every unsuccessful I/O command execution increments (e.g., by 1), the value of starve counter field 108. An outstanding tokens field 110 indicates a count of tokens consumed by associated sNIC-1 which are yet to be returned back to common token pool 46. The value of outstanding tokens field 110 indicates the number of outstanding I/O commands for sNIC-1.

A maximum threshold tokens field 112 indicates the maximum number of tokens that can be outstanding at any given time for any policy type that includes a maximum bandwidth limitation. Any I/O command resulting in the current outstanding token count to increase beyond the value of maximum outstanding tokens field 112 is throttled. A minimum threshold tokens field 114 indicates the minimum number of tokens required to sustain the guaranteed bandwidth utilization for any policy type that includes a minimum bandwidth guarantee. If current outstanding token count decreases below the value of minimum threshold tokens field 114, starve counter 108 is incremented until I/O operations of other sNICs 24 are throttled. A maximum IOPS field 116 specifies the allowed maximum IOPS for any policy type that specifies the maximum IOPS.

Turning to FIG. 10, FIG. 10 is a simplified diagram illustrating example details of flow table 38 according to an embodiment of communication system 10. According to an example embodiment, each of sNICs 24, for example, sNIC-1, is associated with three flow table entries, namely command entry 40, response entry 60 and BUSY response entry 61. As an example, consider command entry 40. Command entry 40 includes fields for a key, packet count, total I/O bytes, IOPs, sNIC policy context, rewrite rules and steering action. The key indicates the LIF ID (e.g., which identifies the sNIC associated with the flow table entry, say sNIC-1) and filter ID. For a SCSI command, the filter ID corresponds to 1 (or other suitable unique identifier).

During operation, packet classifier 34 filters Ethernet command packet 80 and returns key 100, including LIF ID for sNIC-1 and filter ID 1. Key 100 is used to index into flow table 38; the lookup yields command entry 40 for sNIC-1. The total command count for sNIC-1 is entered into the packet count field. The value indicates the total number of I/O operations initiated by sNIC-1. In various embodiments, each flow table entry records the number of hits in flow table 38. For example, the packet count field value for all entries in the aggregate indicates the total number of hits in flow table 38 during a specified predetermined time interval. Because the space allocated for tuples is larger than the size of the key (2 bytes) used to index, the remaining space in flow table 38 can be used to store per sNIC policy context information and to track I/O related information, such as the total bytes transferred in a successful I/O operation. In various embodiments, the total I/O bytes field is updated by appropriate microcode routines invoked as part of the I/O completion handling.

Total I/O bytes field remains empty for filter ID associated with the SCSI command. IOPS field indicates the IOPS completion per second for sNIC-1; the value of the field is completed after the associated SCSI command is successfully completed. In an example embodiment, the I/O completions per second are monitored by a thread executing on control processor 50. It measures the IOPS by taking into account the number of successful completions per second from flow table entry 60 corresponding to the same LIF ID (sNIC-1) and filter ID=2. sNIC policy context field indicates the policy type for sNIC-1 (e.g., storage access parameters and the context required to maintain active state). The rewrite rules field identifies the specific arbiter routine to be used for sNIC-1 for the specific filter ID 1. The value of the rewrite rules field provides an address or ID of the rewrite rule to be invoked as a result of the flow table hit. A steering action field provides an RQ number associated with a particular data processor (e.g., 54) where the associated SCSI command is processed.

Similarly, in the response data path, Ethernet response packet 86 for sNIC-1 returns key 100, including LIF ID for sNIC-1 and filter ID 2 at packet classifier 34. Key 100 is used to index into flow table 38; the lookup yields command entry 60 for sNIC-1. The total response count for sNIC-1 is entered into the packet count field. The value indicates the total number of I/O operations successfully completed by sNIC-1. The total bytes transferred in the successful I/O operation is entered in the total I/O bytes field. In some embodiments, the value of the field indicates the cumulative bytes transferred for associated sNIC-1. The sNIC policy context field is populated by an address pointing to the QoS policy context area for associated sNIC-1. The policy context is maintained in flow table entry 40 associated with sNIC-1 and filter ID=1. Rewrite rule field is populated (by firmware executing on control processor 50) with the address or ID of the rewrite rule to be invoked as a result of the flow table hit. The steering action field is populated (by firmware executing on control processor 50) with the host RQ to which the packet is forwarded.

Likewise, in the BUSY response path, Ethernet BUSY packet 92 for sNIC-1 returns key 100, including LIF ID for sNIC-1 and filter ID 3 at packet classifier 34. Key 100 is used to index into flow table 38; the lookup yields command entry 61 for sNIC-1. The total number of commands responded with BUSY status is entered in the packet count field. The total I/O bytes field and the IOPS field remain empty. The rewrite rule field provides a decap rewrite rule to be invoked to strip off the Ethernet header of Ethernet BUSY packet 92. The value of the steering action field indicates the host RQ of sNIC-1 to which the packet is forwarded.

Figure 11:
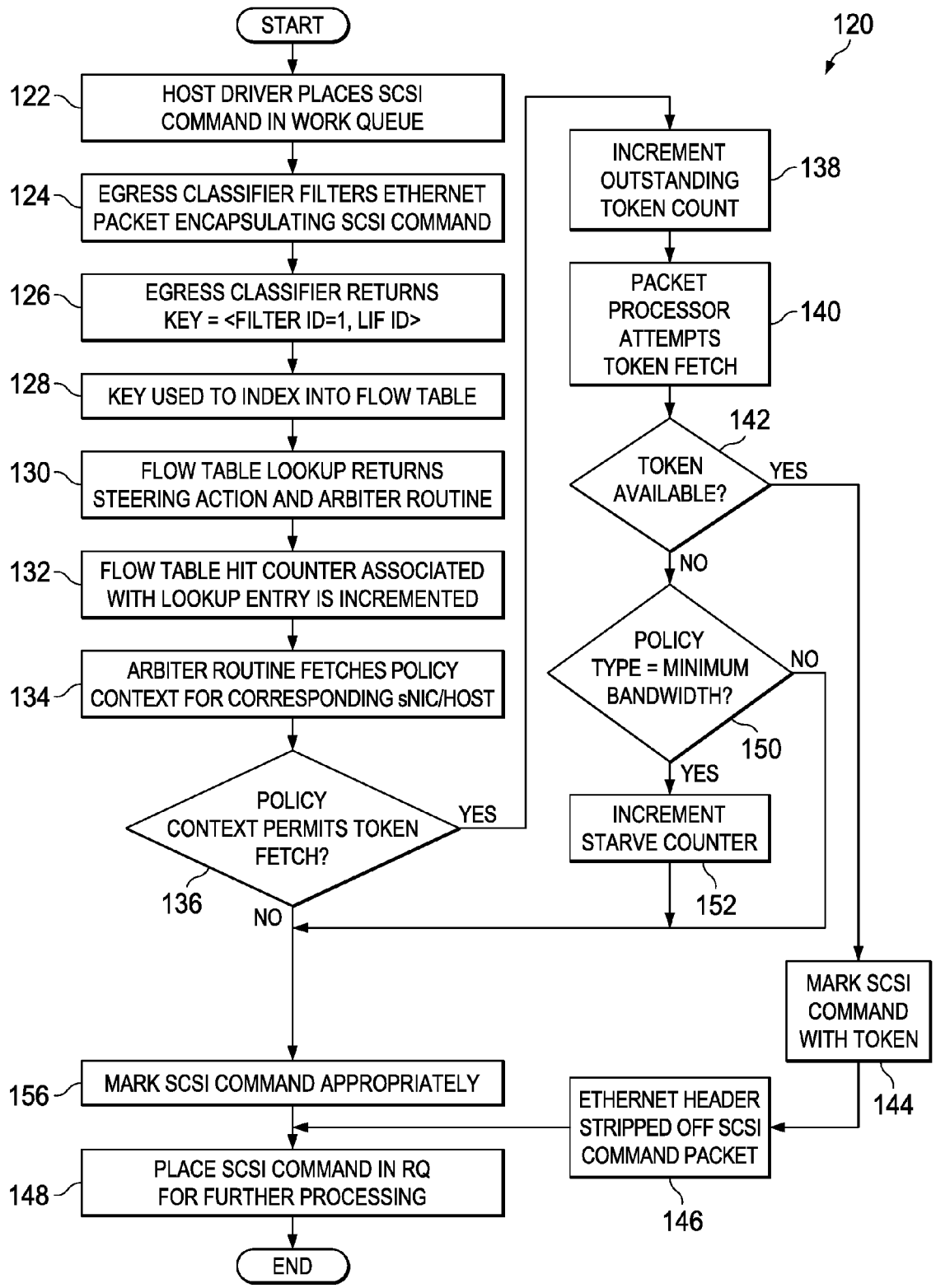
FIG. 11 is a simplified flow diagram illustrating example operations that may be associated with an embodiment of the communication system.

Turning to FIG. 11, FIG. 11 is a simplified flow diagram illustrating example operations 120 that may be associated with an embodiment of communication system 10. At 122, the host driver places a SCSI command in command work queue 32 of sNIC-1 as Ethernet command packet 80. At 124, packet classifier 34 filters Ethernet command packet 80 encapsulating the SCSI command. Ethernet command packet 80 finds a match in packet classifier 34, which returns a tuple <Filter ID=1, LIF Id> as key 100 at 126. Filter ID=1 classifies the packet as a SCSI command packet. Note that although filters IDs of 1, 2 and 3 are disclosed herein, any suitable filter ID value may be used within the broad scope of the embodiments to represent SCSI command, SCSI response and SCSI BUSY response.

At 128, key 100 is used to index into flow table 38, according to the action step mandated in packet classifier 34. At 130, the flow table match returns a steering action and arbiter routine (e.g., rewrite rule) to be invoked on Ethernet command packet 80 comprising the SCSI command. The flow table hit counter (e.g., packet count field) associated with the lookup entry is also incremented at 132. At 134, appropriate arbiter routine fetches per sNIC policy context 48 for corresponding sNIC-1 (or Host-1). In an example embodiment, the policy context is stored in a flow table memory region to ensure its presence in an L2 cache.

At 136, arbiter routine determines whether the policy context permits a token fetch. For example, policy context 20 for sNIC-1 is read. If the value of state field 102 is PAUSED, indicating that the I/O operation is throttled, no token is awarded. If policy type field 106 has a value of 0x01 or 0x05 (or otherwise indicates maximum IOPS count), the arbiter routine checks the current IOPS count, and if it is higher than the value in maximum IOPs field 116, no token is awarded. If the policy type field 106 has a value of 0x02 or 0x06 (or otherwise indicates maximum bandwidth), the arbiter routine checks the current outstanding token count, and if it is greater than the value of maximum threshold tokens field 112, the I/O operations is throttled and no token is awarded. If a token fetch is permitted, at 138, the outstanding token count is incremented. At 140, packet processor 42 attempts a token fetch from common token pool 46. At 142, a determination may be made whether a token is available in common token pool 46. If a token is available, at 144, the SCSI command is marked with the token. At 146, the Ethernet header is stripped from Ethernet command packet 80. At 148, the SCSI command is placed in command RQ 52 for further processing by data processor 54.

Turning back to 142, if no token is available in common token pool 46, at 150, a determination is made whether policy context 20 specifies a minimum bandwidth policy type. For example, policy types 0x04 and 0x06 specify a minimum guaranteed bandwidth. If so, at 152, the value of starve counter field 108 is incremented and the command packet is marked to indicate the unavailability of the token at 156. On the other hand, if the token is awarded, the value of starve counter field 108 is reset to zero. At 150, if the policy type does not specify any minimum bandwidth, the operations step to 156, at which the command packet is marked to indicate the unavailability of the token. The operations step to 148, with the SCSI command being placed in command RQ 52 for further processing by data processor 54. Turning back to 136, if policy context 20 does not permit a token fetch, the operations step to 156, at which the command packet is marked to indicate the unavailability of the token, and continue thereafter. In any case, the command arrives at data path processor 54 either with an assigned token or indication that the command cannot be processed and is to be busied. Data processor 54 uses a command index specified in the token to issue an I/O command to shared storage controller 30, or takes other steps as appropriate.

Figure 12:
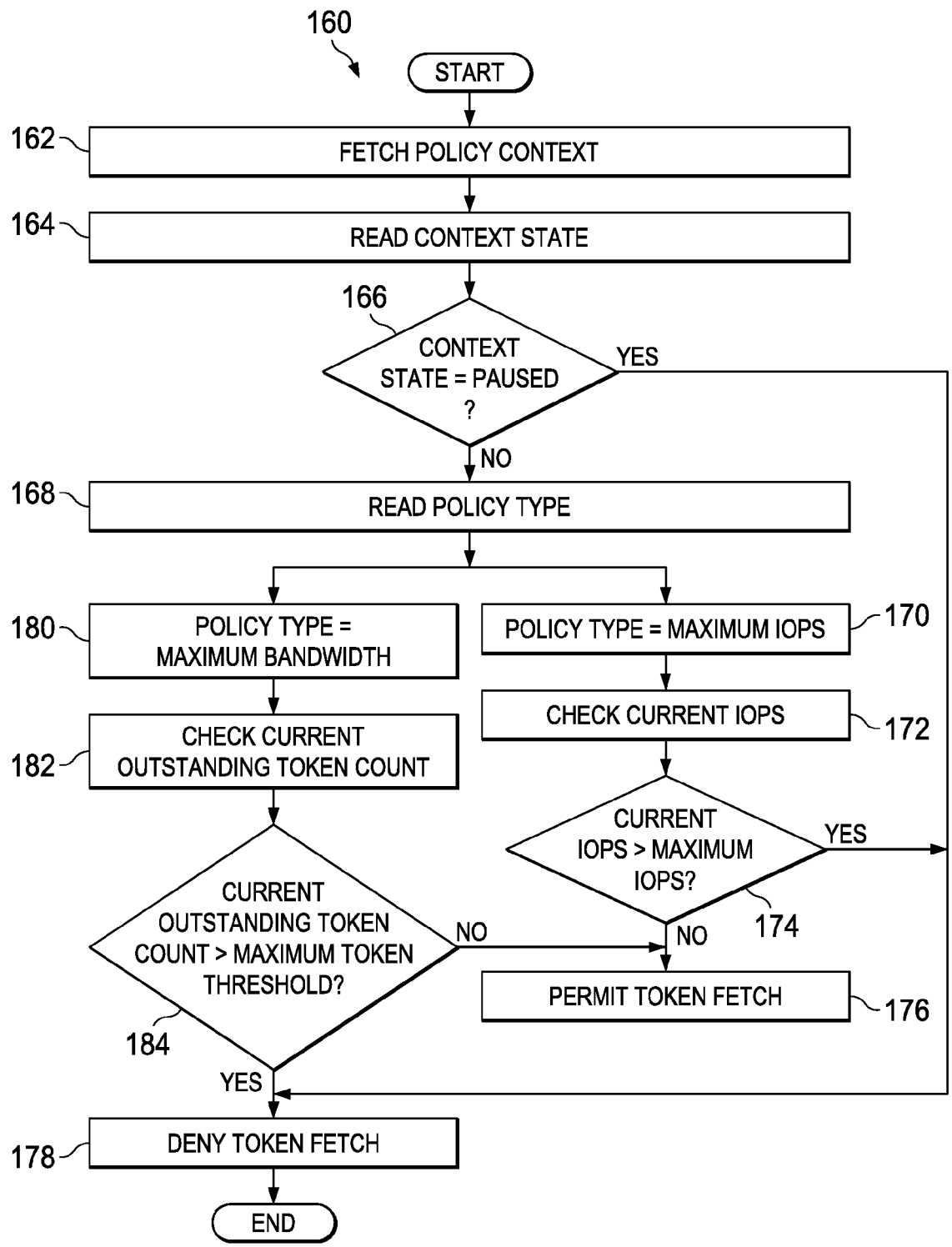
FIG. 12 is a simplified flow diagram illustrating other example operations that may be associated with an embodiment of the communication system.

Turning to FIG. 12, FIG. 12 is a simplified flow diagram illustrating example operations 160 that may be associated with embodiments of communication system 10. At 162, policy context 20 associated with sNIC-1 may be fetched by the arbiter routine. At 164, value of state field 102 of policy context 20 for sNIC-1 is read. At 166, a determination is made if the value of state field 102 is PAUSED. If not, at 168, value of policy type field 106 is read. According to various embodiments, the policy type may indicate maximum bandwidth (e.g., policy type=0x02 or 0x06), or maximum IOPS (e.g., policy type=0x01 or 0x5). If the policy type indicates maximum IOPS at 170, at 172, current IOPS is checked. At 174, a determination is made whether the current IOPS is higher than the value in maximum IOPs field 116. If it is not higher, at 176, token fetch is permitted. On the other hand, if it is higher, at 178, token fetch is denied.

Turning to 168, if the policy type indicates maximum bandwidth at 180, at 182, the current outstanding token count is checked by the arbiter routine in packet processor 42. if it is greater than the value of maximum threshold tokens field 112, the I/O operations is throttled and no token is awarded at 178. If it is not greater than the value of maximum threshold tokens field 112, the token fetch may be permitted at 176. Turning back to 166, if the context state is PAUSED, indicating the I/O operation is throttled, the operations step to 178, at which the token fetch is denied.

Figure 13:
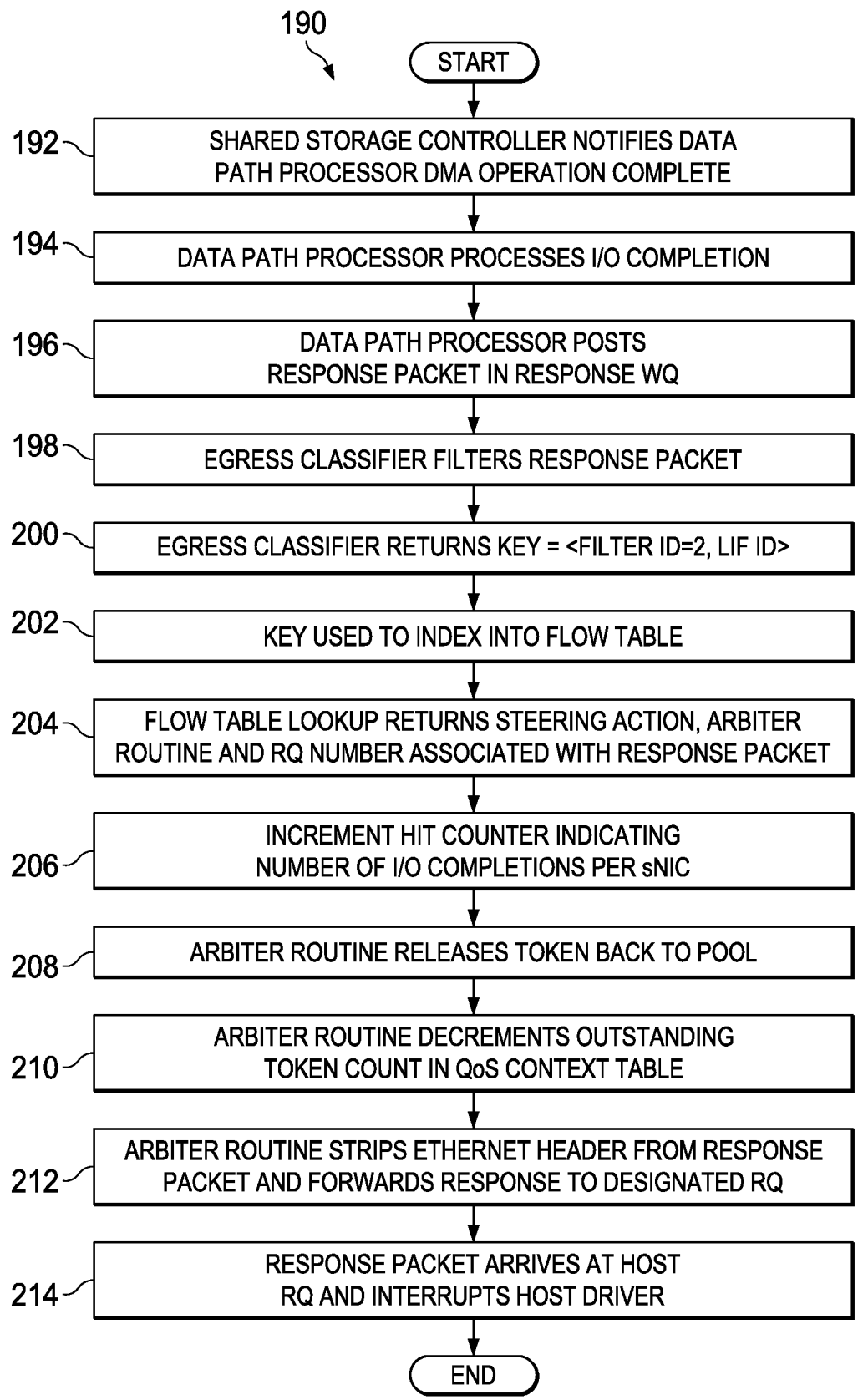
FIG. 13 is a simplified flow diagram illustrating yet other example operations that may be associated with an embodiment of the communication system.

Turning to FIG. 13, FIG. 13 is a simplified flow diagram illustrating operations 190 that may be associated with embodiments of communication system 10. At 192, shared storage controller 30 notifies data path processor 54 that DMA operation is complete. At 194, data path processor 54 processes the I/O completion notification, associating the notification with the outstanding I/O command. At 196, data path processor generates Ethernet response packet 86 and posts Ethernet response packet 86 in its Response WQ 58. At 198, packet classifier 34 filters Ethernet response packet 86, for example, by matching relevant fields with the filter values. At 200, packet classifier 34 returns the result of the match as a tuple, <Filter ID=2, LIF ID>. At 202, key 100 is used to index into flow table 38. At 204, the flow table lookup returns a steering action, RQ number associated with the SCSI command at sNIC-1, and an appropriate arbiter routine address.

At 206, the hit counter indicating number of I/O operations completed per second is incremented. At 208, the arbiter routine releases the token back to common token pool 46. At 210, the arbiter routine decrements the outstanding token count in a QoS context table. At 212, the arbiter routine strips the Ethernet header from Ethernet response packet 86, and forwards the response to the designated RQ. At 214, the response packet arrives at the host RQ and interrupts the host driver that initiated the SCSI I/O operation.

Figure 14:
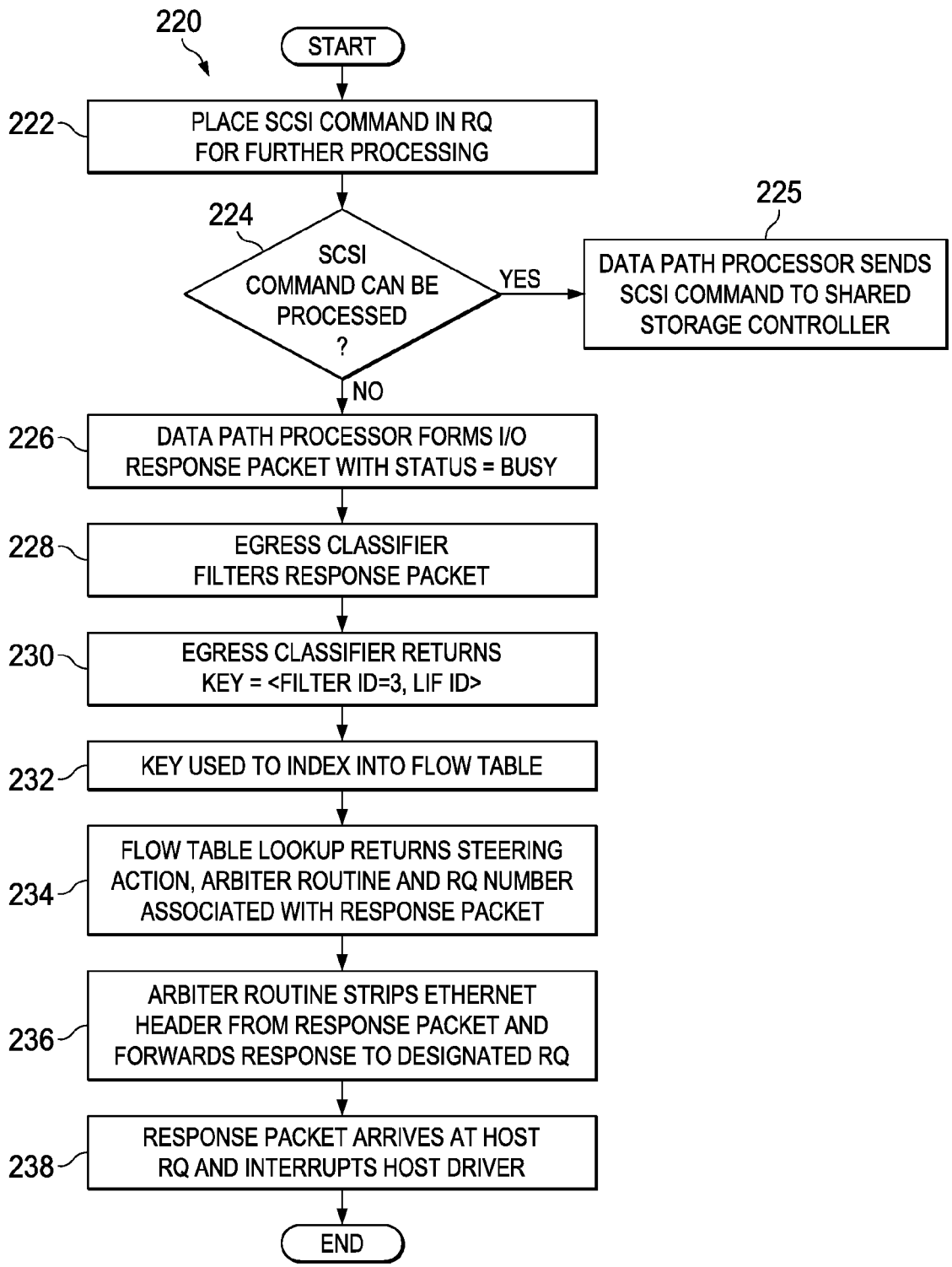
FIG. 14 is a simplified flow diagram illustrating yet other example operations that may be associated with an embodiment of the communication system.

Turning to FIG. 14, FIG. 14 is a simplified flow diagram illustrating example operations 220 that may be associated with embodiments of communication system 10. At 222, the SCSI command is placed in command RQ 52 of data processor 54. At 224, a determination is made whether the SCSI command can be processed. The determination is based on the token indicator associated with the SCSI command, or throttling of the I/O operation based on policy context 20. If tokens are available as indicated in the SCSI command, at 225, data path processor 54 sends the SCSI command to shared storage controller 30 for further processing. If no tokens are available, at 226, data path processor 54 forms (e.g., generates, creates, formats, etc.) Ethernet BUSY packet 90 with status=BUSY. At 228, packet classifier 34 filters Ethernet BUSY packet 90. At 230, packet classifier 54 returns key 100 with tuple <Filter ID=3, LIF ID>. At 232, key 100 is used to index into flow table 38. At 234, the flow table lookup returns an appropriate steering action, arbiter routine and RQ number associated with the response packet of the I/O operation. At 236, the arbiter routine strips the Ethernet header from Ethernet BUSY packet 90, and forwards the response to the designated RQ. At 238, the BUSY packet arrives at the host RQ and interrupts the host driver that initiated the SCSI I/O operation.

Figure 15:
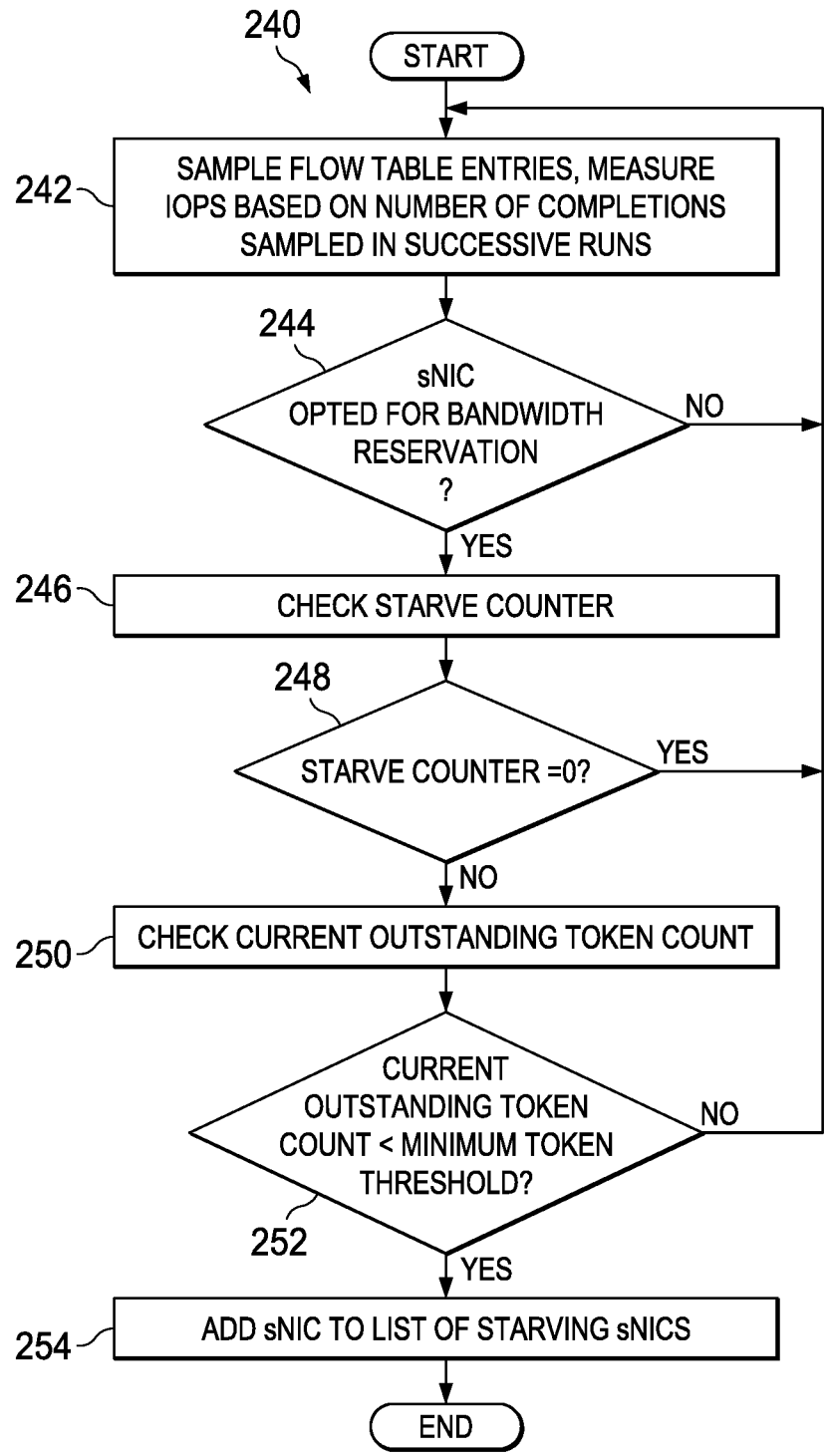
FIG. 15 is a simplified flow diagram illustrating yet other example operations that may be associated with an embodiment of the communication system.

Turning to FIG. 15, FIG. 15 is a simplified flow diagram illustrating example operations 240 performed by periodic sampler 66 that may be associated with an embodiment of communication system 10. At 242, low frequency periodic sampler 66 samples the flow table entries for sNICs 24 and measures IOPS based on the number of completions sampled in successive runs. At 244, period sampler 66 determines whether the particular sNIC associated with the flow table entry being sampled has opted for bandwidth reservation (e.g., policy context 20 indicates minimum guaranteed bandwidth). If so, at 246, periodic sampler 66 checks the value of starve counter field 108. A determination is made at 248 if the value of starve counter field 108 is zero. If the value of starve counter field 108 is 0, the operations revert to 242, and other flow table entries are sampled. If the value of starve counter field 108 is non-zero, at 250, periodic sampler 66 checks the outstanding token count. At 252, a determination is made whether the outstanding token count is less than the value of minimum threshold tokens field 114. If not, the operations revert to 242, and the next flow table entry is sampled. If the outstanding token count is less than the value of minimum threshold tokens field 114, starvation is indicated, where the I/O operations cannot be completed at the minimum guaranteed bandwidth. The sNIC associated with the flow table entry being sampled is considered as a starving sNIC and added to starving sNIC list 72 at 254.

In various embodiments, operations 240 may be performed in a single sweep (e.g., execution, run, etc.) of periodic sampler 66. In other embodiments, operations 240 may be performed piecemeal, for example, within a predetermined time interval, or until starving sNIC list 72 reaches a particular size. Various other options that determine a frequency of execution of periodic sampler 66 may be used within the broad scope of the embodiments.

In some embodiments, low frequency periodic sampler 66 detects during its execution that some of sNICs 24 are being throttled and monitors the condition of sNICs 24 that have minimum bandwidth requirement. If all sNICs 24 are able to perform I/O operations at guaranteed bandwidth, periodic sampler 66 unblocks sNICs 24 from throttled sNIC list 74 in the reverse order in which sNICs 24 were initially added to throttled sNIC list 74. In some embodiments, in every invocation of low frequency periodic sampler 66, a predetermined subset of throttled sNICs 24 are unblocked, for example, to avoid overload on the system. While unblocking, periodic sampler 66 monitors the situation and stops the unblock operation if at least one starved sNIC 24 is detected.

Figure 16:
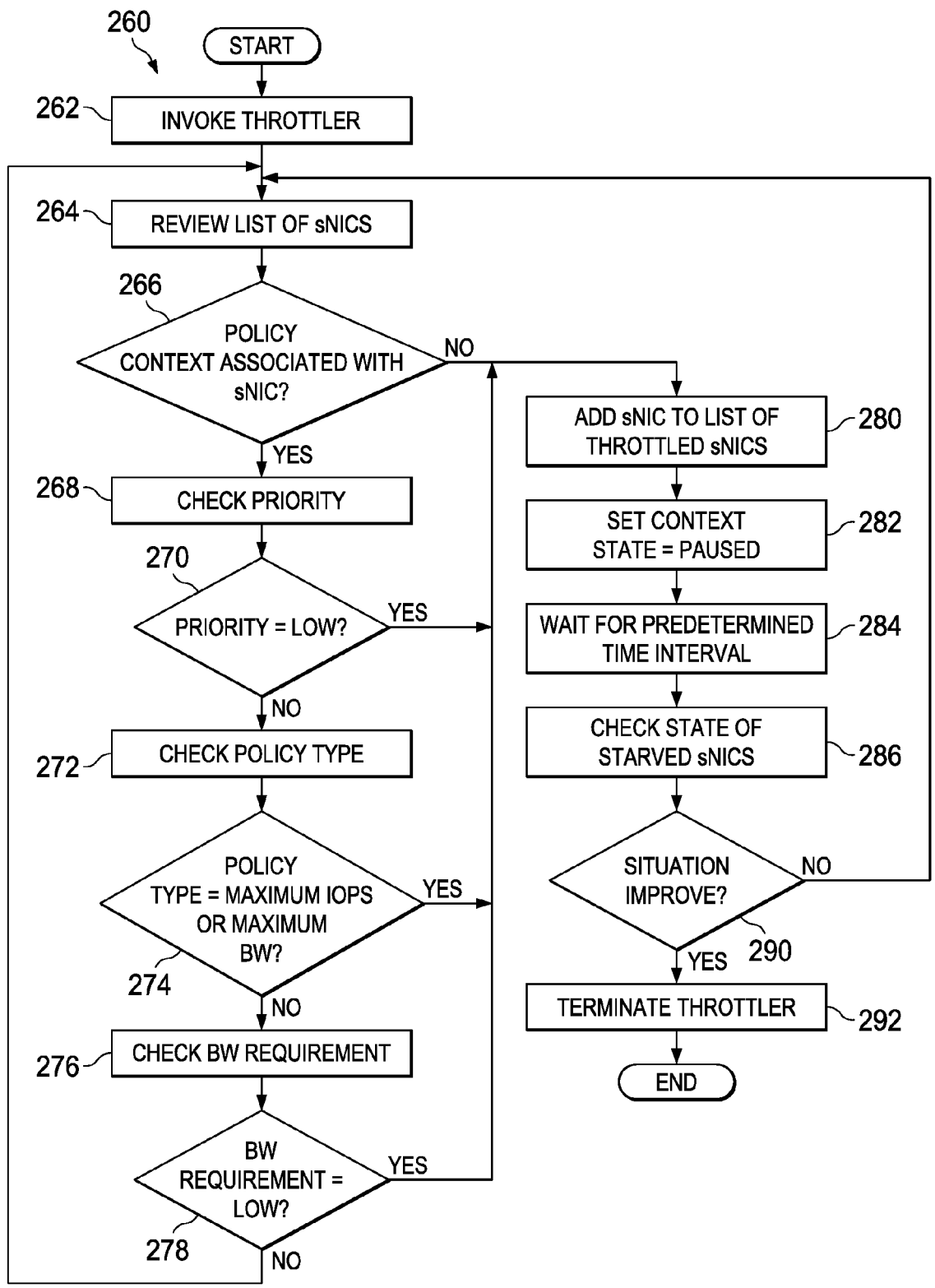
FIG. 16 is a simplified flow diagram illustrating yet other example operations that may be associated with an embodiment of the communication system.

Turning to FIG. 16, FIG. 16 is a simplified flow diagram illustrating example operations 260 of throttler 68 that may be associated with embodiments of communication system 10. High frequency throttler 68 is invoked at 262. In some embodiments, throttler 68 is evoked on demand. In other embodiments, throttler 68 is evoked at predetermined time intervals. In some embodiments, throttler 68 is scheduled to execute at least once in a predetermined time interval (e.g., every 100 ms) after being invoked until violations of policy context 20 are resolved satisfactorily. At 264, throttler 68 reviews sNIC list 70.

For each sNIC on sNIC list 70, throttler 68 performs the following operations. At 266, throttler 68 makes a determination whether the sNIC has any specific policy context 20 associated therewith. If the sNIC has a specific policy context 20 associated therewith, at 268, throttler 68 checks the value of priority field 104 in policy context 20. At 270, throttler 68 makes a determination whether the value of priority field 104 is "low". If the value of priority field 104 is not "low" (e.g., low priority sNICs are selected before "normal" priority sNICs), at 272, throttler 68 checks the value of policy type field 106 in policy context 20. At 274, throttler 68 makes a determination whether the value of policy type field 106 indicates a Max IOPS (e.g., 0x01) or Max Bandwidth utilization (e.g., 0x02) policy. If not, at 276, throttler 68 checks any bandwidth requirement in policy context 20. At 278, throttler 68 makes a determination whether the bandwidth requirement is low (e.g., relatively lower than other sNICs) and the sNIC is not experiencing any violation of its per sNIC policy context 48. If not, the operations revert to 264, and the next sNIC in sNIC list 70 is reviewed. If bandwidth requirement is low, at 280, the sNIC is added to throttled sNIC list 74.

Turning back to 266, if no policy context 20 is associated with the sNIC, the sNIC is added to throttled sNIC list 74. Turning back to 270, if the value of priority field 104 is "low", the sNIC is added to throttled sNIC list 74. Turning back to 274, if the value of policy type field 106 indicates a Max IOPS (e.g., 0x01) or Max Bandwidth utilization (e.g., 0x02) policy, the sNIC is added to throttled sNIC list 74.

At 282, the context state of sNICs in throttled sNIC list 74 is set to PAUSED. Setting the context state to PAUSED throttles any I/O operation associated with the sNIC. At 284, throttler 68 waits for a predetermined time interval (e.g., 100 ms). At 286, throttler 68 checks the state of starving sNIC list 72. At 290, throttler 68 makes a determination whether a size of starving sNIC list 72 has decreased (e.g., indicating fewer number of starving sNICs) and the situation has improved. If starving sNIC list 72 has not decreased in size, the operations revert to 264, and additional sNICs are selected to be throttled. If the situation has improved (e.g., previously starved sNICs are able to perform I/O operations at desired bandwidth utilization) throttler 68 is terminated at 292. In some embodiments, before terminating, throttler 68 also updates QoS monitor 64 to indicate completion of the throttling task.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software. In some embodiments, one or more of these features may be implemented in hardware, provided external to these elements, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, the VNFs and associated servers described and shown herein (and/or their associated structures) may also include suitable interfaces for receiving, transmitting, and/or otherwise communicating data or information in a network environment. The VNFs described herein may be provisioned on servers comprising memory elements and processors. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., storage resource 18, packet classifier 34, flow table 38) can store data used for the operations described herein. This includes the memory element being able to store instructions (e.g., software, logic, code, etc.) in non-transitory media, such that the instructions are executed to carry out the activities described in this Specification. A processor (e.g., control processor 50, packet processor 42, data path processor 54) can execute any type of instructions associated with the data to achieve the operations detailed herein in this Specification. In one example, processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in the communication system could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

In various embodiments, the operations described herein facilitate improvements in storage traffic optimization technologies, allowing compute nodes 14 to operate faster, or more efficiently according to administrator specified policies at a central management application in the network. The operations described herein solve problems uniquely associated with a multi-host computing environment, in which multiple compute nodes 14 access shared storage resource 18 through a shared transmission medium (e.g., PCIe bus). Such problems did not exist before computers or computer networks, or before multiple computing devices were aggregated together for shared efficiencies.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, the communication system may be applicable to other exchanges or routing protocols. Moreover, although the communication system has been illustrated with reference to particular elements and operations that facilitate the communication process, these elements, and operations may be replaced by any suitable architecture or process that achieves the intended functionality of the communication system.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
receiving, at an input/output (I/O) adapter in a microserver chassis comprising a plurality of compute nodes and a shared storage resource, policy contexts prescribing storage access parameters of respective compute nodes;
enforcing, at the I/O adapter, the respective policy contexts on I/O operations by the compute nodes, wherein a particular I/O operation by any compute node is not executed when the respective policy context does not permit the particular I/O operation;
allocating tokens to command descriptors associated with I/O operations for accessing the shared storage resource;
identifying, at the I/O adapter, a violation of any policy context of any compute node based on availability of the tokens; and
throttling I/O operations by other compute nodes until the violation disappears.

2. The method of claim 1, further comprising programming a packet classifier in the I/O adapter to filter storage traffic local to the microserver chassis.

3. The method of claim 1, further comprising populating a flow table in the I/O adapter with actions according to the policy context.

4. The method of claim 1, wherein enforcing the respective policy contexts comprises:
receiving at a Small Computer System Interface (SCSI) network interface card (sNIC) of the I/O adapter, a SCSI packet generated by one of the compute nodes, the sNIC being uniquely associated with the compute node, the I/O operations by the compute node comprising a SCSI command;
encapsulating, at the sNIC, the SCSI packet in an Ethernet packet comprising a fake preset destination address and source address in an Ethernet header;
filtering, at a packet classifier of the I/O adapter, the Ethernet header based on the fake preset destination address and source address, wherein the packet classifier returns a key based on the filtering;
indexing into a flow table in the I/O adapter with the key, the flow table comprising a plurality of flow table entries specifying respective actions, at least one of the actions including calling an arbiter routine that varies according a type of the SCSI packet; and
executing the arbiter routine.

5. The method of claim 4, wherein if the type of the SCSI packet comprises a SCSI command, the arbiter routine determines if the policy context permits a token fetch, wherein if the policy context permits the token fetch, the arbiter routine attempts to fetch one of the tokens.

6. The method of claim 5, wherein if the token is available, the arbiter routine marks the SCSI command with the fetched token, strips the Ethernet header from the Ethernet packet and places the SCSI command in a command queue for processing by a data path processor, wherein the data path processor issues the SCSI command to a shared storage controller, wherein the shared storage controller executes the SCSI command on the shared storage resource.

7. The method of claim 5, wherein if the token is not available, the arbiter routine checks the respective policy context of the compute node uniquely associated with the sNIC for a minimum bandwidth guarantee, wherein if the policy context specifies the minimum bandwidth guarantee, the arbiter routine marks the sNIC as starved, marks the SCSI command to indicate no token, strips the Ethernet header and places the SCSI command in a command queue for processing by a data path processor.

8. The method of claim 4, wherein if the type of the SCSI packet comprises a SCSI response, the arbiter routine increments a hit counter in the flow table indicative of a number of I/O operations completed for the sNIC, decapsulates the Ethernet packet and forwards the SCSI response to the sNIC.

9. The method of claim 4, wherein if the type of the SCSI packet comprises a SCSI busy response indicating token unavailability, the arbiter routine decapsulates the Ethernet packet and forwards the SCSI busy response to the sNIC.

10. The method of claim 1, wherein identifying the violation comprises executing a periodic sampler comprising a thread of instructions, wherein the periodic sampler samples flow table entries in the I/O adapter, determines whether sNICs associated with respective compute nodes are marked as starved, and identifies as the violation any sNIC marked as starved for unavailability of the tokens.

11. The method of claim 1, wherein throttling I/O operations by other compute nodes comprises executing a high frequency throttler comprising a thread of instructions, wherein the throttler identifies sNICs associated with respective compute nodes that can be throttled based on respective policy contexts associated with their corresponding compute nodes, adds the identified sNICs to a list of throttled sNICs, and changes a context state in corresponding policy contexts associated with the identified sNICs to indicate that I/O operations are paused, wherein no tokens are awarded to the paused sNICs.

12. Non-transitory tangible computer readable media that includes instructions for execution, which when executed by a processor, performs operations comprising:
receiving, at an I/O adapter in a microserver chassis comprising a plurality of compute nodes and a shared storage resource, policy contexts prescribing storage access parameters of respective compute nodes;
enforcing, at the I/O adapter, the respective policy contexts on I/O operations by the compute nodes, wherein a particular I/O operation by any compute node is not executed when the respective policy context does not permit the particular I/O operation;
allocating tokens to command descriptors associated with I/O operations for accessing the shared storage resource;
identifying, at the I/O adapter, a violation of any policy context of any compute node based on availability of the tokens; and
throttling I/O operations by other compute nodes until the violation disappears.

13. The media of claim 12, wherein the operations further comprise programming a packet classifier in the I/O adapter to filter storage traffic local to the microserver chassis.

14. The media of claim 12, wherein the operations further comprise populating a flow table in the I/O adapter with actions according to the policy context.

15. The media of claim 12, wherein enforcing the respective policy contexts comprises:
receiving at a sNIC of the I/O adapter, a SCSI packet generated by one of the compute nodes, the sNIC being uniquely associated with the compute node, the I/O operations by the compute node comprising a SCSI command;
encapsulating, at the sNIC, the SCSI packet in an Ethernet packet comprising a fake preset destination address and source address in an Ethernet header;
filtering, at a packet classifier of the I/O adapter, the Ethernet header based on the fake preset destination address and source address, wherein the packet classifier returns a key based on the filtering;

indexing into a flow table in the I/O adapter with the key, the flow table comprising a plurality of flow table entries specifying respective actions, at least one of the actions including calling an arbiter routine that varies according a type of the SCSI packet; and executing the arbiter routine.

16. An apparatus, comprising:

a plurality of compute nodes;

a shared storage resource;

an I/O adapter facilitating access by the compute nodes to the shared storage resource over a shared transmission medium; and at least one processor, wherein the processor executes instructions, such that the apparatus is configured for:
receiving, at the I/O adapter, policy contexts prescribing storage access parameters of respective compute nodes;
enforcing, at the I/O adapter, the respective policy contexts on I/O operations by the compute nodes, wherein a particular I/O operation by any compute node is not executed when the respective policy context does not permit the particular I/O operation;
allocating tokens to command descriptors associated with I/O operations for accessing the shared storage resource;
identifying, at the I/O adapter, a violation of any policy context of any compute node based on availability of the tokens; and
throttling I/O operations by other compute nodes until the violation disappears.

17. The apparatus of claim 16, wherein the apparatus is further configured for programming a packet classifier in the I/O adapter to filter storage traffic local to the apparatus.

18. The apparatus of claim 17, wherein the apparatus is further configured for populating a flow table in the I/O adapter with actions according to the policy context.

19. The apparatus of claim 16, wherein enforcing the respective policy contexts comprises:
receiving at a sNIC of the I/O adapter, a SCSI packet generated by one of the compute nodes, the sNIC being uniquely associated with the compute node, the I/O operations by the compute node comprising a SCSI command;
encapsulating, at the sNIC, the SCSI packet in an Ethernet packet comprising a fake preset destination address and source address in an Ethernet header;
filtering, at a packet classifier of the I/O adapter, the Ethernet header based on the fake preset destination address and source address, wherein the packet classifier returns a key based on the filtering;
indexing into a flow table in the I/O adapter with the key, the flow table comprising a plurality of flow table entries specifying respective actions, at least one of the actions including calling an arbiter routine that varies according a type of the SCSI packet; and
executing the arbiter routine.

20. The apparatus of claim 16, wherein identifying the violation comprises executing a periodic sampler comprising a thread of instructions, wherein the periodic sampler samples flow table entries in the I/O adapter, determines whether sNICs associated with respective compute nodes are marked as starved, and identifies as the violation any sNIC marked as starved for unavailability of the tokens.

* * * * *